(12) United States Patent
Ueno et al.

(10) Patent No.: US 7,095,592 B2
(45) Date of Patent: Aug. 22, 2006

(54) HEAD SLIDER AND DISK DRIVE APPARATUS

(75) Inventors: Yoshihiro Ueno, Osaka (JP); Tatsuhiko Inagaki, Osaka (JP); Zhi Sheng Deng, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 336 days.

(21) Appl. No.: 10/103,928

(22) Filed: Mar. 25, 2002

(65) Prior Publication Data

US 2002/0196585 A1   Dec. 26, 2002

(30) Foreign Application Priority Data

| Mar. 27, 2001 | (JP) | ............................. 2001-089476 |
| Jul. 18, 2001 | (JP) | ............................. 2001-217768 |
| Jul. 18, 2001 | (JP) | ............................. 2001-217770 |
| Jul. 26, 2001 | (JP) | ............................. 2001-225908 |
| Jul. 26, 2001 | (JP) | ............................. 2001-225909 |

(51) Int. Cl.
*G11B 5/60* (2006.01)

(52) U.S. Cl. .................................... 360/236

(58) Field of Classification Search ................ 360/236, 360/236.1–236.3, 235.6–235.9
See application file for complete search history.

(56) References Cited

U.S. PATENT DOCUMENTS

| 6,021,020 | A * | 2/2000 | Itoh et al. ................ 360/236.1 |
| 6,144,529 | A * | 11/2000 | Wada et al. .............. 360/236.1 |
| 6,288,874 | B1 * | 9/2001 | Ito ............................ 360/235.5 |
| 6,445,544 | B1 * | 9/2002 | Kohira et al. ................ 360/245 |
| 6,493,179 | B1 * | 12/2002 | Kohira et al. ............ 360/97.01 |
| 6,493,188 | B1 * | 12/2002 | Tokisue et al. .......... 360/245.1 |
| 6,744,600 | B1 * | 6/2004 | Kohira et al. ............ 360/236.3 |
| 2001/0010612 | A1 | 8/2001 | Koishi et al. |
| 2001/0022707 | A1 | 9/2001 | Koishi et al. |

FOREIGN PATENT DOCUMENTS

| JP | 03230378 | 10/1991 |
| JP | 05028682 | 2/1993 |
| JP | 06-068462 | 3/1994 |
| JP | 08-227514 | 9/1996 |
| JP | 08-279132 | 10/1996 |
| JP | 09-153277 | 6/1997 |
| JP | 09-282602 | 10/1997 |
| JP | 10-069748 | 3/1998 |
| JP | 10-283622 | 10/1998 |
| JP | 11016141 | 1/1999 |
| JP | 2000-21111 | 1/2000 |
| JP | 2000-040319 | 2/2000 |
| JP | 2000057724 | 2/2000 |

(Continued)

*Primary Examiner*—Angel Castro
(74) *Attorney, Agent, or Firm*—Wenderoth, Lind & Ponack, L.L.P.

(57) ABSTRACT

Disclosed is a head slider having excellent shock resistance, a head supporter, as well as a disk drive using the head slider. The head slider is characterized in a form of its opposite-to-disk surface, such that a fixed point is set at a position located outwardly of a rear end portion of the head slider and at a predetermined distance from a load application point, which load urges the slider toward a disk. When a shock force is externally applied to the head slider, the head slider is rotated about this fixed point such that at least one of pitch angle and roll angle is maintained positive. Because of this structure, a disk drive excellent in shock resistance can be provided.

33 Claims, 16 Drawing Sheets

FOREIGN PATENT DOCUMENTS

| | | |
|---|---|---|
| JP | 2000-173217 | 6/2000 |
| JP | 2000-182344 | 6/2000 |
| JP | 2000-306226 | 11/2000 |
| JP | 2000-339896 | 12/2000 |
| JP | 2001202732 | 7/2001 |

* cited by examiner

HEAD SLIDER AND DISK DRIVE APPARATUS

FIELD OF THE INVENTION

The present invention relates to a head slider having mounted thereon an information converting transducer for recording and playing back data on a disk-shaped recording medium, such as a magnetic disk and a magneto-optic disk. The present invention also relates to a disk drive apparatus using such a head slider.

BACKGROUND OF THE INVENTION

Recently, there have been made great technological advances in disk recording and playback apparatus (hereinafter referred to as "disk drive") for recording and playing back data on a disk-shaped recording medium such as a hard disk and an optical disk (hereinafter referred to as "disk"), and its use is expanding not only in application of conventional computers but also in many other fields. There are increasing demands for such disk drives that are capable of higher density recoding, resistant to external disturbance such as shock force so as to prevent a disk and a head slider from damage and maintain stabilized recording and playing back performances, and small in size so as to be mounted on portable equipment. However, it sometimes occurred in conventional disk drives, when subjected to external shock force, that the head slider collided with or came into contact with a disk so as to cause wear or damage to the head slider or the disk, such that data recorded on the disk was destroyed, and even the disk drive itself was damaged.

Therefore, there have been demands for improved shock resistance of head sliders, suspensions, or actuator arms used in disk drives. Since, a head slider, in particular, is held above a disk at a small flying height, it tends to collide with the disk when subjected to shock force. Therefore, it is desired to provide a head slider structure which will, at least, not cause fatal damage to a head slider or disk even when a shock force is applied thereto. However, there are few examples of studies so far made of an optimum form or shape of a surface of the head slider opposite to the disk (hereinafter, referred to as "opposite-to-disk surface"), to improve shock resistance. There have conventionally been made studies to suppress variation in a flying height of a rear end portion of a head slider, where a transducer is provided, against variation in skew angle, atmospheric pressure, and so on.

For example, a structure of a head slider is disclosed in U.S. Pat. No. 6,021,020, which, even when there is variation in skew angle, in atmospheric pressure, in external force due to swinging of the head slider, or in load applied thereto, allows positive pressure and negative pressure applied to the head slider to be maintained in good balance based on such variation. It is stated therein that virtually no change is made, by virtue of the good balance thus obtained, in flying height in the vicinity of the transducer, so that stabilized information recording or playback is made possible. In JP8-227514, there is disclosed a structure in which a distance, to a surface of a disk, from a portion of a head slider at which a transducer is provided is virtually not changed even if an external force to increase a pitch angle is applied to the structure. In U.S. Pat. No. 4,909,223, there is disclosed a method to obtain an optimum form or shape of a surface of a head slider opposite to a disk by calculation with use of molecular gas lubrication equations. Further, in U.S. Patent Application No. 2001/0010612, there is disclosed a structure in which collision of a head slider, due to rolling of the head slider, with a disk is prevented by increasing roll stiffness of the head slider. However, in this structure, spring stiffness, obtained by assuming a viscous fluid film formed between the head slider and the disk to be a spring, is not large enough to cope with shock force.

In all the above disclosures, it is designed to suppress variation in flying height of a rear end portion of a head slider under conditions of varied skew angle of the head slider, varied atmospheric pressure, varied load from a suspension, and so on. However, when these variations are compared with externally applied shock force, the shock force is much stronger. Therefore, it is difficult to say that any of the above disclosures is quite effective against shock force.

At times, when for example a head slider is subjected to a great external shock force, the head slider comes to have a negative pitch angle, i.e., a flying height of a front end portion of the head slider becomes, reversely, lower than a flying height of a rear end portion of the head slider. Under conditions of such a negative pitch angle, a viscous fluid such as air stops entering a space between the head slider and a disk surface. As a result, positive pressure disappears, and thereby the head slider is caused to collide with the disk and become damaged.

Especially, disk drives for use in portable equipment are required to be smaller in disk diameter and, in addition, to be smaller in disk rotating speed. Hence, velocity of viscous fluid flowing through a space between a head slider and a disk becomes smaller than in conventional disk drives. Hence, there arises also a problem with regard to how to realize a slider structure having sufficient shock resistance under conditions of such low fluid velocity.

SUMMARY OF THE INVENTION

The present invention has been made to solve the above-mentioned problems. It is an object of the invention to provide a head slider having a fixed point set at a position at least outwardly from a rear end portion of the head slider so that the head slider, when a shock force is externally applied thereto, is allowed to make a rotational displacement around the fixed point in a direction to decrease at least one of a pitch angle and a roll angle, and thereby absorb the shock force.

The head slider, flying over a surface of a disk-shaped recording medium for performing at least one of recording and playback by using a transducer, comprises:
 a front end portion on a forward side of the head slider with respect to a rotating direction of a disk-shaped recording medium;
 a rear end portion on a rearward side of the head slider;
 an opposite-to-disk surface arranged to be opposite the disk-shaped recording medium; and
 a transducer disposed on the opposite-to-disk surface, in which
 the head slider is allowed to fly over a surface of the disk-shaped recording medium under a dynamic pressure, produced from a viscous fluid flow accompanying rotation of the disk-shaped recording medium and a load urging the head slider toward the disk-shaped recording medium, and
 the opposite-to-disk surface is formed to have a fixed point set at a position located rearwardly from the rear end portion of the head slider and at a predetermined distance from a point of load application, wherein the head slider is to rotate around the fixed point, when a shock force is externally applied to the head slider while flying over the surface of the disk-shaped recording medium, in a direction in which at least one of pitch angle and roll angle decreases while each of these angles remains positive.

Because of the above-described formation of the opposite-to-disk surface, the head slider, even when an external shock force is applied thereto, is enabled to absorb the shock force by rotating in such a way as to keep at least one of the pitch angle and the roll angle at a positive value by virtue of spring stiffness of a viscous fluid film produced at a front end side and a rear end side of the head slider. Hence, even if a large shock force is applied to the head slider, its collision with a disk surface can be prevented or energy produced at the time of such a collision can be reduced so that the head slider or the disk is prevented from being damaged. Thus, a highly reliable head supporting mechanism and disk drive can be manufactured, and a disk drive with large-capacity and of a small and thin type can be mounted on portable equipment.

DETAILED DESCRIPTION OF THE PREFERRED EMBODIMENTS

Figure 1A:
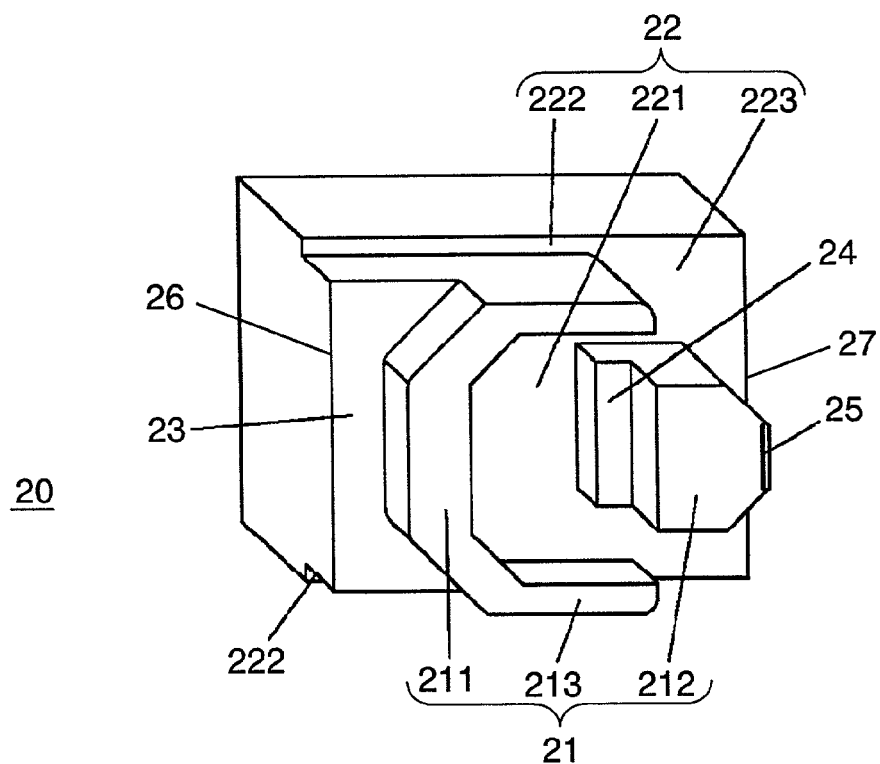
FIG. 1A is a perspective view of a head slider of a first exemplary embodiment of the invention seen from a side of an opposite-to-disk surface thereof.

Head sliders and disk drives using the same according to exemplary embodiments of the invention will be described below with reference to their respective drawings. Throughout the drawings, similar elements are denoted by similar reference numerals.

First Exemplary Embodiment

Figure 1B:
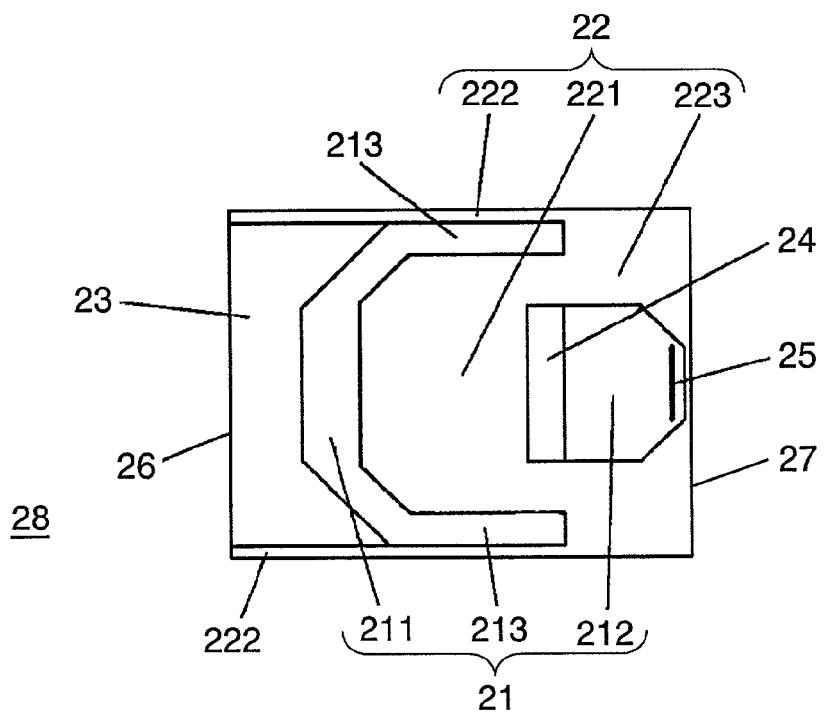
FIG. 1B is a plan view of the head slider of the first exemplary embodiment.

FIG. 1A and FIG. 1B are a perspective view of a head slider of a first exemplary embodiment of the invention seen from a side of an opposite-to-disk surface and a plan view of the same, respectively. Head slider 20 has opposite-to-disk surface 28 on one surface of a body thereof virtually of a rectangular parallelepiped shape.

Figure 2:
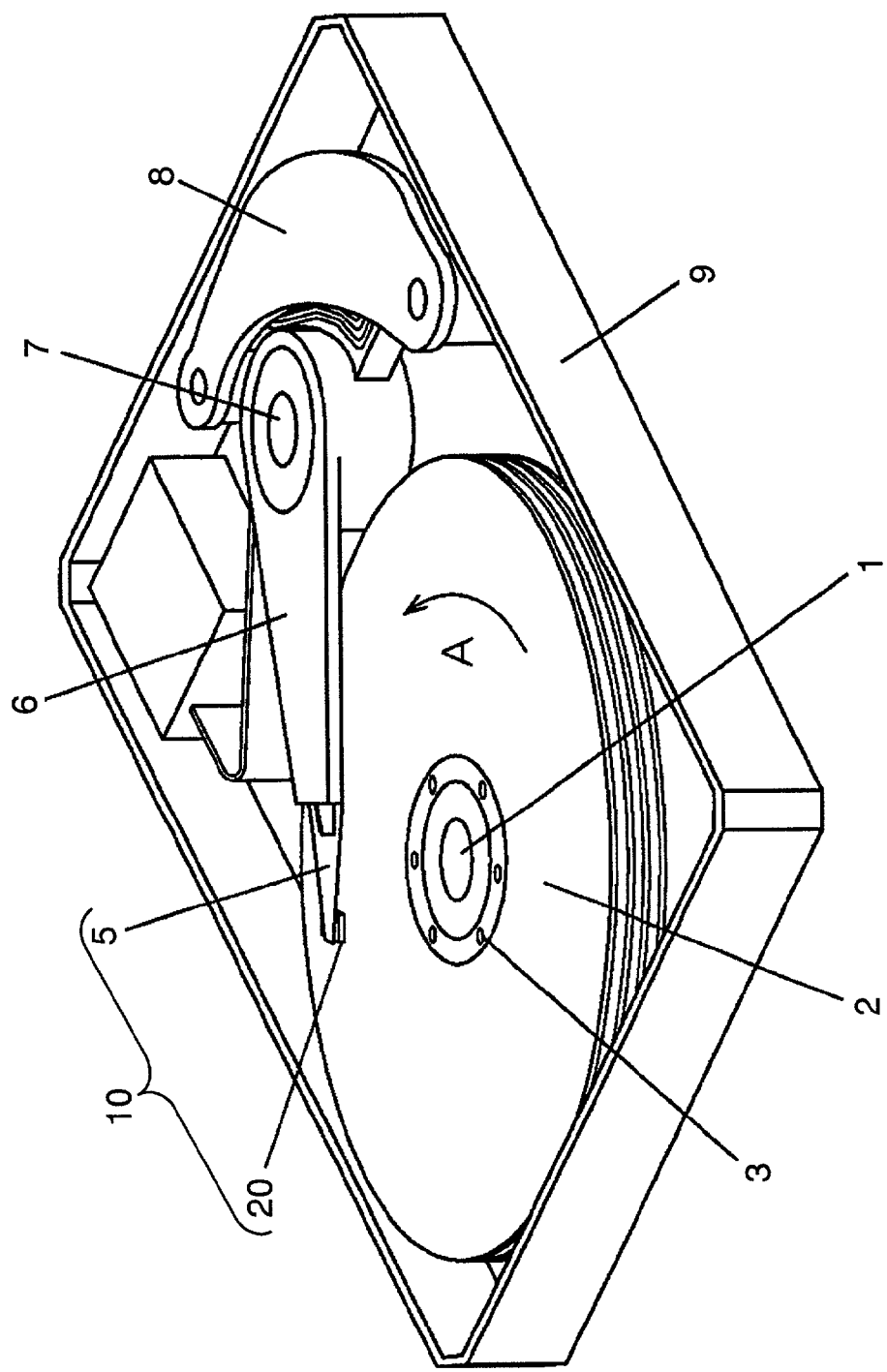
FIG. 2 is a perspective view of a main portion of a disk drive of the invention.

FIG. 2 is a perspective view of a main portion of a disk drive using head slider 20. Disk 2 is supported on main spindle 1 and rotationally driven by driver 3. As driver 3, a spindle motor, for example, is used. Head slider 20 having a transducer (not shown) for performing recording and playback is fixed to suspension 5. Suspension 5 is fixed to actuator arm 6 and actuator arm 6, in turn, is rotatably attached to actuator shaft 7. Positioning structure 8, for which a voice coil motor, for example, is used, allows actuator arm 6 to swing so as to shift head slider 20 to a predetermined truck position on disk 2. Housing 9 keeps the above-described components in predetermined relative positions and is covered with a lid, not shown, to prevent dust and harmful gas from entering the housing.

Figure 3:
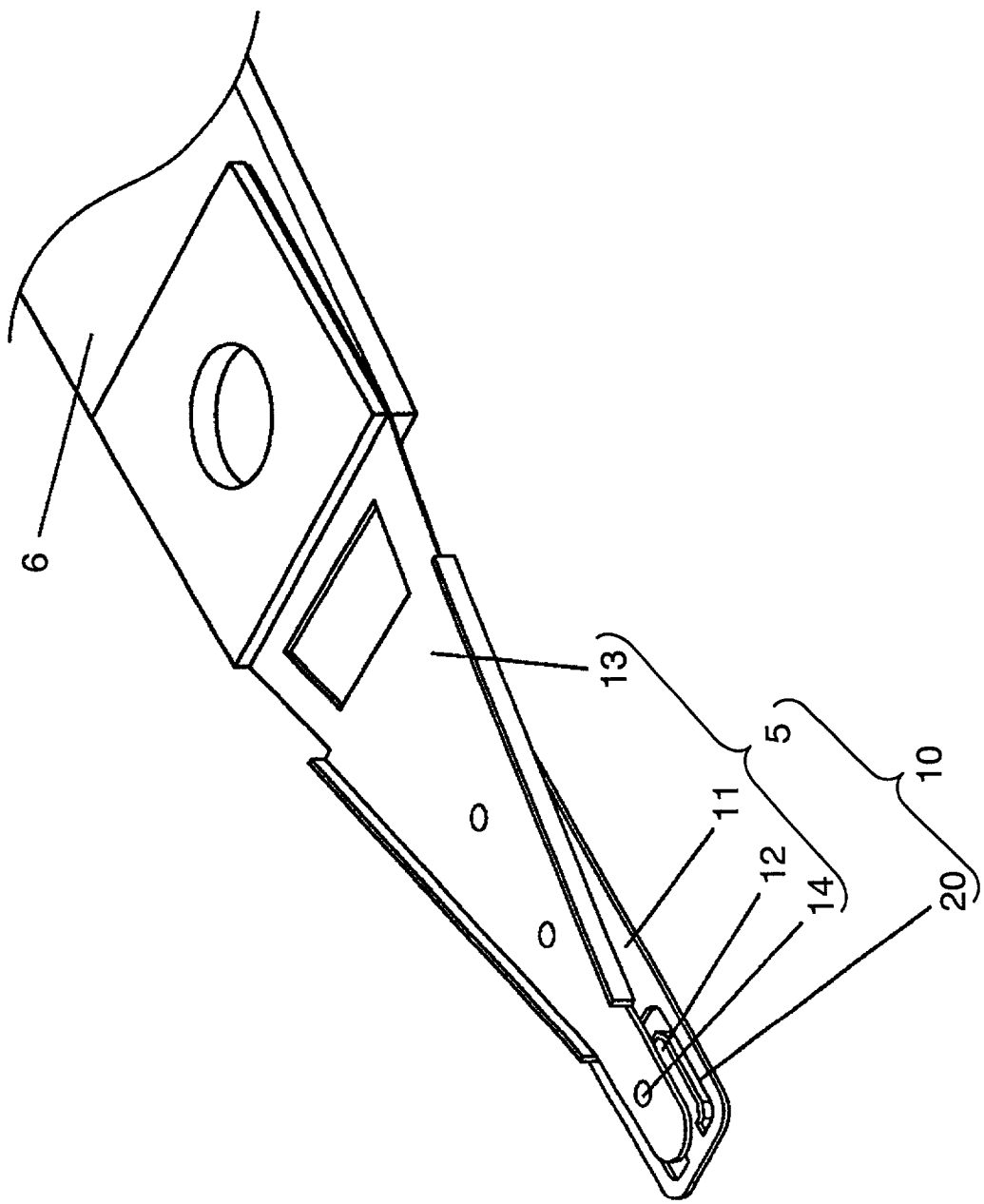
FIG. 3 is a perspective view of a head supporter of the invention.

FIG. 3 is a perspective view of a main portion showing a structure of head supporter 10 having head slider 20 fixed to suspension 5. Suspension 5 is made up of slider supporter 11 and beam 13. Head slider 20 is fixed to tongue-shaped section 12 provided at a distal end of slider supporter 11. Another end of slider supporter 11 is fixed to beam 13. Slider supporter 11, for which a gimbal spring, for example is used, has a structure allowing head slider 20 to perform a pitch operation and a roll operation. Head slider 20 is fixed to slider supporter 11 by, for example, an adhesive, and slider supporter 11 is fixed to beam 13 by, for example, welding/soldering. Beam 13 is provided at a front end thereof with pivot 14 for applying a load to head slider 20, i.e., a predetermined load is applied to head slider 20 via pivot 14.

When recording and playback are performed by such a disk drive, three forces as mentioned below are applied to head slider 20, and the head slider is allowed to fly over a surface of the disk 2 under a condition that these forces are kept in balance. More specifically, a first of the forces is that of the load applied by suspension 5. A second of the forces is a positive force, acting to fly head slider 20 over the disk, produced by inflow of viscous fluid, such as air, accompanying rotation of the disk, through a space between disk 2 and head slider 20. A third of the forces is that of a negative pressure produced by the same viscous fluid flowing into a negative pressure generating section, which is a large recess in head slider 20, so as to allow the viscous fluid to suddenly expand to generate negative pressure. This negative pressure acts to draw head slider 20 toward disk 2. While head slider 20 is held at a predetermined flying height, positioning structure 8 is driven such that head slider 20 is positioned at a predetermined truck position, and the transducer (not shown) is allowed to record information onto disk 2 or play back recorded information from the disk.

Structure of head slider 20 of the present exemplary embodiment will be described in detail with reference to FIG. 1A and FIG. 1B. On opposite-to-disk surface 28, there are formed positive pressure generating section 21 and negative pressure generating section 221. Positive pressure generating section 21 is made up of first positive pressure generating section 211, side rails 213 disposed, in connection with first positive pressure generating section 211, on both sides thereof in a lateral direction of the opposite-to-disk surface, and second positive pressure generating section 212 disposed centrally in the lateral direction at rear end portion 27 and formed of a hexagonal shape as illustrated. Incidentally, first positive pressure generating section 211 has an elevation in level via a step from an edge of first intermediate-level surface 23 and formed of a portion perpendicular to a direction of the inflow of the viscous fluid, and also has diagonal portions extended from the perpendicular portion and connected with both side rails 213.

Negative pressure generating section 221 is a region surrounded by positive pressure generating section 21 and a second intermediate-level surface 24 so as to define a deep recess between these portions. This negative pressure generating section 221, side lower-level surfaces 222 located outwardly from side rails 213, and rear lower-level surface 223 disposed close to rear end portion 27 are surfaces at the same level. Transducer 25 is provided on a side toward a rear end of second positive pressure generating section 212, and is integral with the second positive pressure generating section.

By virtue of the above-described configuration, a stable flying attitude of the head slider at a positive pitch angle, while flying over the disk surface, can be achieved, even if positive pressures generated by positive pressure generating section 21 at a front end side and a rear end side are distributed such that pressure at the rear end side is greater, because a center of application of negative pressure generated by negative pressure generating section 221 is provided rearwardly from a point of application (not shown) of the load. Further, by provision of the side rails, shock resistance can be improved, and also stability of the head slider preventing it from moving in the lateral direction, i.e., against variation in a roll angle, can be improved. The term "pitch angle" means an inclination of a head slider along its length with respect to the disk surface. When a flying height at a front end portion is greater than a flying height at a rear end portion, the pitch angle at this time is defined to be positive. The term "roll angle" means inclination of a head slider along its width with respect to the disk surface. When a flying height of a head slider, while flying over the disk surface, on an inner circumferential side is greater than that on an outer circumferential side, the roll angle is defined to be positive.

Although a head slider can be processed by die forming or by general machining, it is preferably processed by wet or dry etching. When it is required to perform highly precise and complicated processing, working by laser beam irradiation, ion irradiation, or the like may be used.

In the case of the first exemplary embodiment, processing by ion irradiation was employed. The difference in level between positive pressure generating section 21 and first intermediate-level surface 23, as well as second intermediate-level surface 24, was set to 0.08 µm, while the difference in level between positive pressure generating section 21 and lower-level surface 22 was set to 1.0 µm. Overall size of head slider 20 was set to be 1.24 mm long, 1.00 mm wide, and 0.3 mm thick.

Figure 8A:
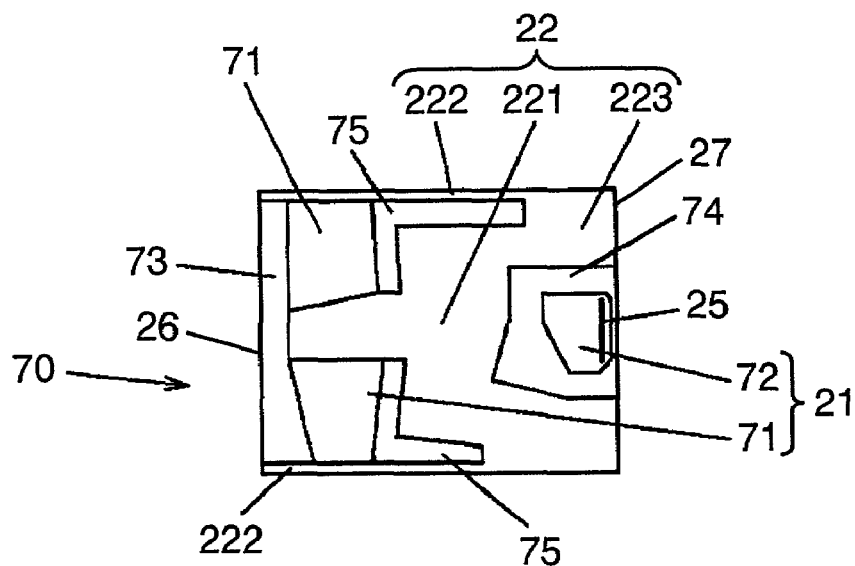
FIG. 8A is a plan view of the head slider of the first comparative example.
Figure 8B:
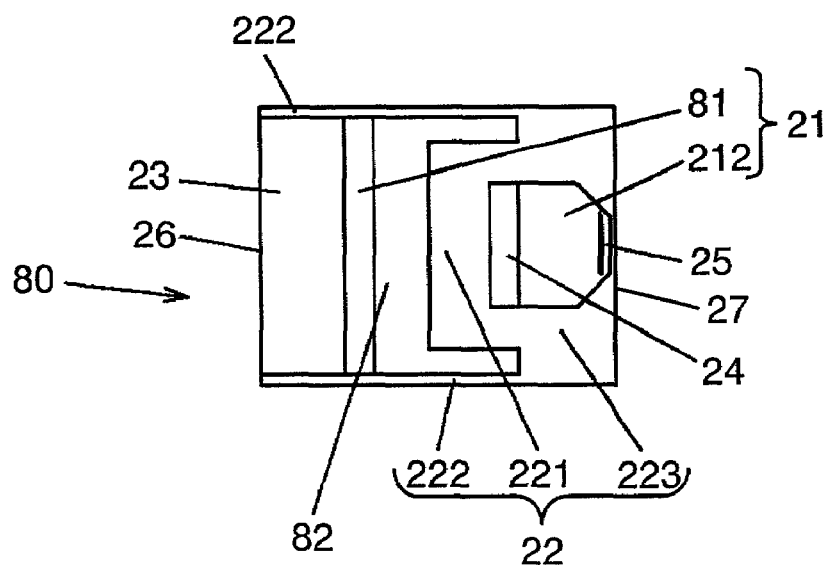
FIG. 8B is a plan view of the head slider of the second comparative example.

For comparison with head slider 20 of the first exemplary embodiment, head sliders as shown in FIG. 8A and FIG. 8B were made as comparative examples. Head slider 70 shown in FIG. 8A will be called comparative example 1, and head slider 80 shown in FIG. 8B will be called comparative example 2. Although comparative example 1 also has positive pressure generating section 21 and negative pressure generating section 221, its structure is different from head slider 20 of the first exemplary embodiment. More specifically, positive pressure generating section 21 of comparative example 1 is made up of first positive pressure generating section 71, which is located at a side of front end portion 26 and centrally divided in two, and second positive pressure generating section 72, which is located at a side of rear end portion 27 and surrounded by second intermediate-level surface 74. While first positive pressure generating section 71 is arranged to be in touch with first intermediate-level surface 73 extended from front end portion 26, the same is also arranged to be in touch with third intermediate-level surface 75 which is L-shaped and provided with a side rail. Second positive pressure generating section 72 is surrounded, as described above, by second intermediate-level surface 74 disposed on a side toward rear end portion 27 and, second positive pressure generating section 72 is provided with transducer 25 at its rear end. Negative pressure generating section 221 is a region surrounded by first intermediate-level surface 73, second intermediate-level surface 74, third intermediate-level surface 75, and first positive pressure generating section 71, and this section 221 is at a deepest level as compared with other surfaces. Negative pressure generating section 221, side lower-level surface 222, and rear lower-level surface 223 are on the same level.

Comparative example 2 is characterized in points as follows. Initially, third intermediate-level surface 82 is U-shaped. Second, first positive pressure generating section 81 is of a stripe shape sandwiched between third intermediate-level surface 82 and first intermediate-level surface 23. Third, negative pressure generating section 221, surrounded by second intermediate-level surface 24 and third intermediate-level surface 82, is of a smaller area than is negative pressure generating structure of head slider 20. Otherwise, its structure is the same as that of head slider 20.

When a disk is rotated, viscous fluid such as air flows into a space between the disk and a head slider, and thereby a viscous fluid film is formed in the space between the disk and the head slider. This viscous fluid film acts as a spring when the head slider is displaced along a disk surface. A spring stiffness of the film has different values depending on a form of an opposite-to-disk surface. If the opposite-to-disk surface is of a suitable form, it becomes possible, when the head slider is subjected to a shock force to move it toward the disk, to provide the head slider with a rotational displacement around a certain position corresponding to spring stiffness of the film, and thereby the shock force is absorbed. This position is called a fixed point. Spring stiffness of the viscous fluid film can be obtained by numerical analysis if factors are specified such as form of the opposite-to-disk surface, flying height of the head slider, pitch angle, roll angle, and disk rotating speed. If the spring stiffness is obtained, then a value of shock resistance at a time when the head slider just comes into contact with the disk can similarly be obtained by calculation.

Figure 4:
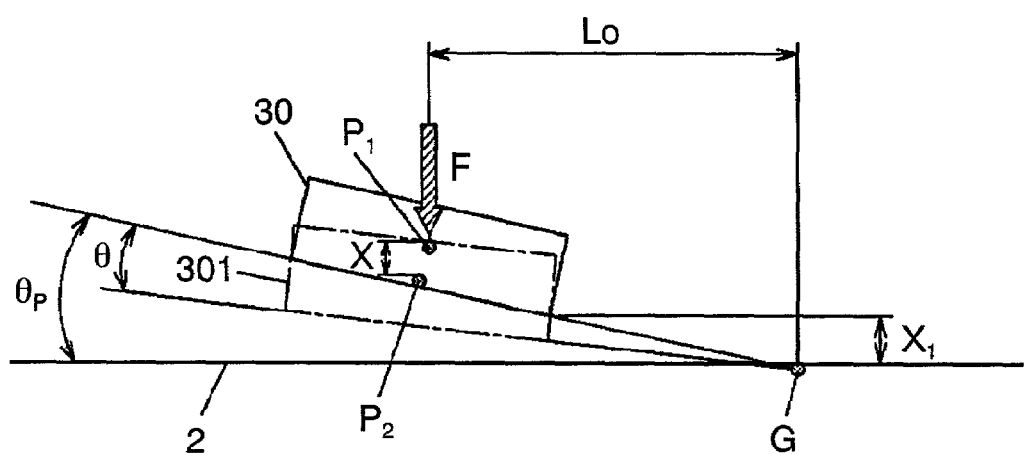
FIG. 4 is an explanatory drawing of a principle of a method to obtain a position of a fixed point from spring stiffness of a viscous fluid film of the invention.

A fixed point can be obtained in a like manner based on the value of the spring stiffness. A method to determine a position of the fixed point from the value of the spring stiffness of a viscous fluid film will be described by reference to the sectional view shown in FIG. 4. A state of head slider 30, flying over disk 2 at a pitch angle of $\theta_p$ and at a flying height of $X_1$ at a rear end portion on the basis of a spring stiffness of a viscous fluid film between an opposite-to-disk surface and the disk, is indicated by full lines. Head slider 301 at a state displaced by a displacement x in a vertical direction and by an angular displacement $\theta$ in the pitch angle upon application of shock force F to head slider 30 is indicated by chain-dotted lines. A position of fixed point G at this time is given, as illustrated, by an intersection of extended lines from the opposite-to-disk surfaces of head slider 30, steadily flying, and of head slider 301 displaced upon application of the shock force. A point of application of load is defined as a point to which load from a suspension (not shown) is applied to urge head slider 30 toward disk 2. This point is placed many times at a center of gravity of head slider 30. The point of application of load rotates from point $P_1$ in a state of steady flight, to point $P_2$ after displacement centering around fixed point G. Since angle $\theta_p$ is very small (approximately 0.1 mrad) and hence $\cos \theta_p \approx 1$, distance $L_0$ from point of application $P_1$ to fixed point G at this time is obtained from the following Equation (1):

$$L_0 = \frac{x}{\theta}. \tag{1}$$

Meanwhile, displacement caused by external shock force F can be expressed by rotational displacement and vertical displacement at the point of application of the load. When displacement in the vertical direction relative to disk 2 is denoted by x and rotational displacement is denoted by $\theta$, with point of application $P_1$ of the load to head slider 30 taken as a reference, the following Equation (2) holds:

$$\begin{pmatrix} k_{11} & k_{12} \\ k_{21} & k_{22} \end{pmatrix} \begin{pmatrix} x \\ \theta \end{pmatrix} = \begin{pmatrix} F \\ 0 \end{pmatrix}, \tag{2}$$

where $k_{11}$, $k_{12}$, $k_{21}$, and $k_{22}$ are moduli of stiffness of a viscous fluid film produced by a viscous fluid flowing into a space between the head slider and the disk. Modulus $k_{11}$ denotes vertical stiffness, modulus $k_{22}$ denotes rotational stiffness, and $k_{12}$ and $k_{21}$ respectively denote modulus of force in rotational direction and modulus of force in vertical direction produced by rotational movement, generated when the head slider is moved in a vertical direction relative to the disk. By modifying Equation (2), the following Equation (3) can be obtained:

$$\begin{pmatrix} x \\ \theta \end{pmatrix} = \frac{1}{\Delta} \begin{pmatrix} k_{22} & -k_{12} \\ -k_{21} & k_{11} \end{pmatrix} \begin{pmatrix} F \\ 0 \end{pmatrix} = \frac{1}{\Delta} \begin{pmatrix} k_{22}F \\ -k_{21}F \end{pmatrix}. \tag{3}$$

Accordingly, distance $L_0$ from the point of application of the load to the fixed point G can be obtained from Equation (1) and Equation (3) as expressed by the following Equation (4); namely, $L_0$ is obtained as a ratio between rotational stiffness $k_{22}$ of the viscous fluid film and modulus of force in the vertical direction produced by rotational movement $k_{21}$:

$$L_0 = \frac{x}{\theta} = -\frac{k_{22}}{k_{21}}. \tag{4}$$

These moduli of stiffness $k_{22}$ and $k_{21}$ can be univocally obtained when such factors as a form of the opposite-to-disk surface of the head slider, rotating speed of the disk, and equivalent mass, i.e., total mass of head slider and suspension, are determined; and thus, distance to fixed point G can be determined by using these values.

Values of spring stiffness, fixed point, and shock resistance were calculated for head slider 20 of the first exemplary embodiment, for comparative example 1, and for comparative example 2 by use of the above numerical analysis. In the numerical analysis, the equivalent mass of the head slider inclusive of the suspension was set to 8 mg, the load of the suspension applied to the head slider was set to 2 gf, the rotating speed of the disk was set to 4500 rpm, and a skew angle at a disk position of 6 mm in radius was set to −5 degrees.

Distances $L_0$ to fixed point G were obtained from a ratio of the above moduli of stiffness, and normalized distances by use of head slider length $L_s$ as a reference, $L_0/L_s$, were obtained as shown in Table 1. Table 1 also shows values of shock resistance calculated from spring stiffness. Incidentally, head slider length $L_s$ is not an actual length of the head slider, but a length parallel to the disk surface. However, since angle $\theta_p$ is very small and, hence, $\cos \theta_p \approx 1$, these values can be regarded as being virtually equal.

TABLE 1

|  | $L_0/L_s$ | Value of Shock Resistance: G |
|---|---|---|
| First Exemplary Embodiment | 0.9 | 1000 |
| Comparative Example 1 | 3.6 | 260 |
| Comparative Example 2 | 0.45 | 570 |

As seen from Table 1, the value of $L_0/L_s$ was 0.9 and the value of shock resistance was 1000 G in head slider 20 of the first exemplary embodiment. In comparative example 1, the value of $L_0/L_s$ was 3.6 and the value of shock resistance was 260 G, while in comparative example 2, the value of $L_0/L_s$ was 0.45 and the value of shock resistance was 570 G.

Figure 5A:
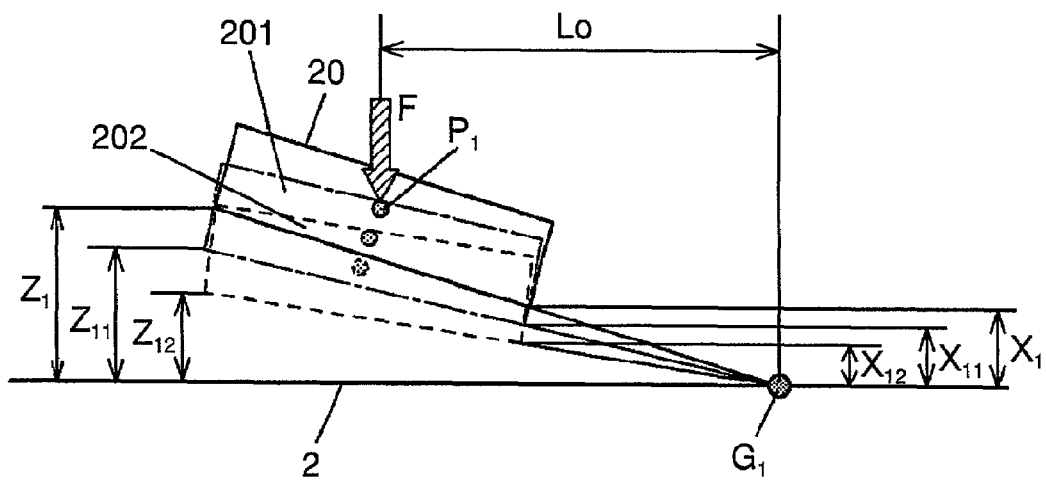
FIG. 5A is a drawing explanatory of a mechanism in the head slider according to the first exemplary embodiment to absorb a shock force.

Description with regard to the above results will be given below with reference to schematic diagrams of FIG. 5A, FIG. 5B, and FIG. 5C. FIG. 5A corresponds to the first exemplary embodiment. In a steady state, head slider 20 is flying over the surface of disk 2 with a flying height of $Z_1$ at a front end portion and a flying height of $X_1$ at a rear end portion. If shock force F is applied to head slider 20 during this state, the head slider is displaced to a position indicated by head slider 201. At this time, though displacement of the flying height at the front end portion $(Z_1-Z_{11})$ is larger than the displacement of the flying height at the rear end portion $(X_1-X_{11})$, the head slider maintains a positive pitch angle. If shock force F is increased, the head slider is displaced to a position indicated by head slider 202. Even in this state, the head slider maintains a positive pitch angle $(Z_{12}>X_{12})$, and hence viscous fluid continues to flow in between the head slider and the disk. Thus, shock force is absorbed and collision between the head slider and the disk is prevented by an effect of spring stiffness of a viscous fluid film. Or, even if a collision between the head slider and the disk occurs, energy of this collision is minimized. Such a value of shock resistance was obtained by setting distance $L_0$, from load application point $P_1$ to fixed point $G_1$, so as to satisfy $L_0/L_s=0.9$. Setting of a value of spring stiffness for obtaining such value $L_0$ can be easily determined solely on the basis of the form of the opposite-to-disk surface, assuming that such factors as viscosity coefficient of the viscous fluid, rotating speed of the disk, skew angle, and load are constant. While rotating speed and skew angle on an inner circumferential side of the disk are different from those on an outer circumferential side, above parameters in dealing with shock resistance should preferably be taken from those on the inner circumferential side where the rotating speed of the disk is at a minimum.

Figure 5B:
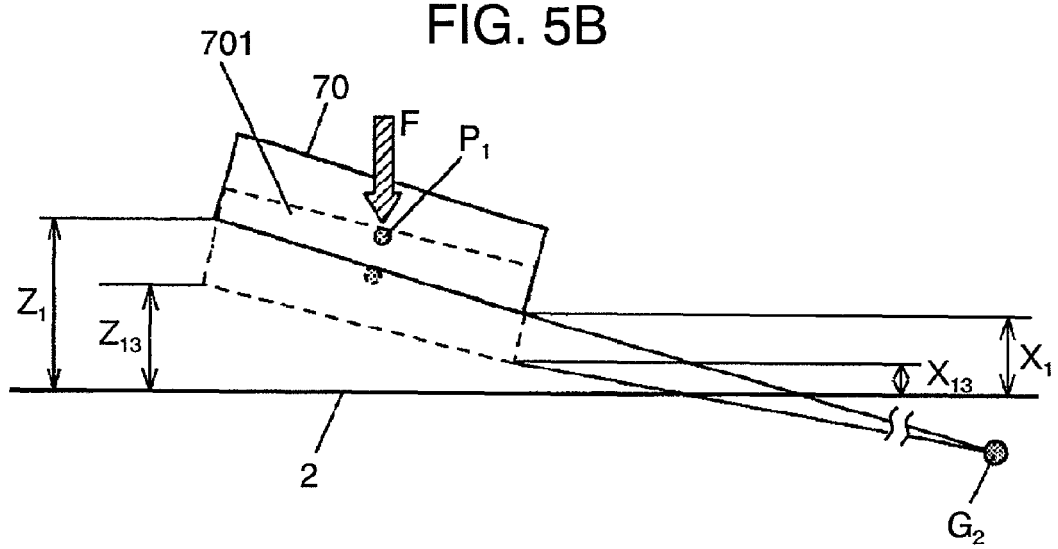
FIG. 5B is an explanatory drawing of operation of a head slider of a first comparative example under application of a shock force thereto.

FIG. 5B shows a schematic diagram corresponding to comparative example 1. When shock force F is applied to head slider 70 of comparative example 1, the head slider is displaced to a position indicated by head slider 701. This displacement occurs because fixed point $G_2$ is positioned from load application point $P_1$ a distance of 3.6 times length $L_s$ of head slider 70. Namely, with such a position of fixed point $G_2$, virtually no rotation in a pitch direction is produced when shock force F is applied $((Z_1-Z_{13})\approx(X_1-X_{13}))$, and displacement is produced only in a vertical direction. Hence, a relatively small shock force causes a rear end portion of the head slider to collide with the disk and, hence, shock resistance becomes low.

Figure 5C:
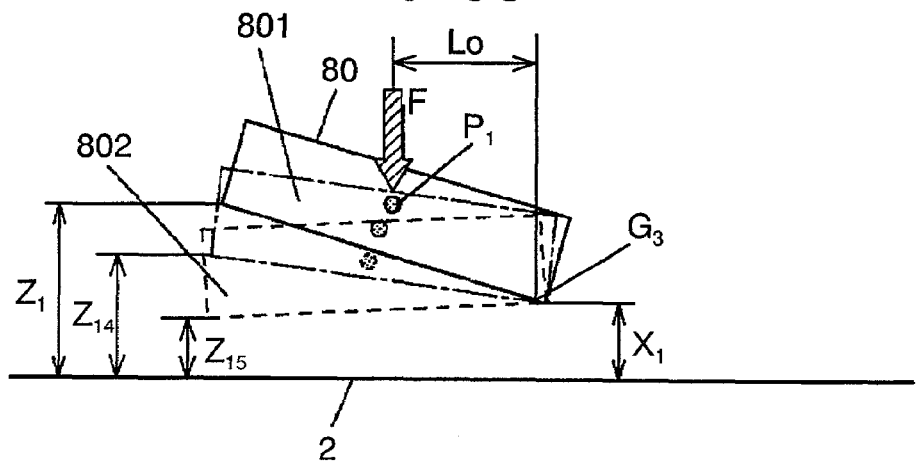
FIG. 5C is an explanatory drawing of operation of a head slider of a second comparative example under application of a shock force thereto.

FIG. 5C shows a schematic diagram corresponding to comparative example 2. In head slider 80 of comparative example 2, ratio $L_0/L_s$ is 0.45, and fixed point $G_3$ is located at a point slightly shifted from a rear end portion toward the side of load application point $P_1$. Accordingly, even if the head slider is displaced to a position indicated by head slider 801 by application of shock force F thereto, the head slider does not collide with the disk and a value of shock resistance becomes greater than in the case of comparative example 1. However, if shock force is increased, flying height at the front end portion $(Z_{15})$ becomes smaller than flying height at the rear end portion $(X_1)$, i.e., $Z_{15}<X_1$. In this state, viscous fluid stops flowing into a space between the head slider and the disk 2, and thereby formation of a viscous fluid film is stopped. Hence, an effect of spring stiffness of the viscous fluid film is lost and head slider 80 comes to collide with surface of disk 2, thereby destroying head slider 80 or disk 2. Further, when the state in which the flying height at the front end portion is smaller than the flying height at the rear end portion $(Z_{15}<X_1)$ is brought about, a slight variation in such values as disk rotating speed, skew angle, or load comes to greatly affect the value of shock resistance, thereby increasing variation of shock resistance.

As described above with reference to schematic drawings, by designing the opposite-to-disk surface such that, when an external shock force is applied to the head slider to compress a viscous fluid film between the head slider and the disk, values of spring stiffness of the viscous fluid film at the front end portion and the rear end portion of the head slider will have predetermined values, and the head slider may exhibit a smaller pitch angle but will rotate with this pitch angle being maintained positive, such that an even greater shock force can be absorbed.

Figure 6A:
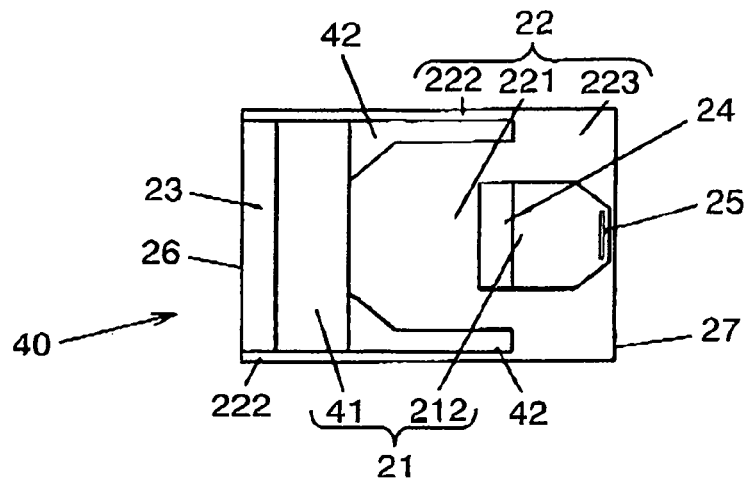
FIG. 6A is a plan view of a head slider according to the first exemplary embodiment of the invention, but having another configuration.
Figure 6B:
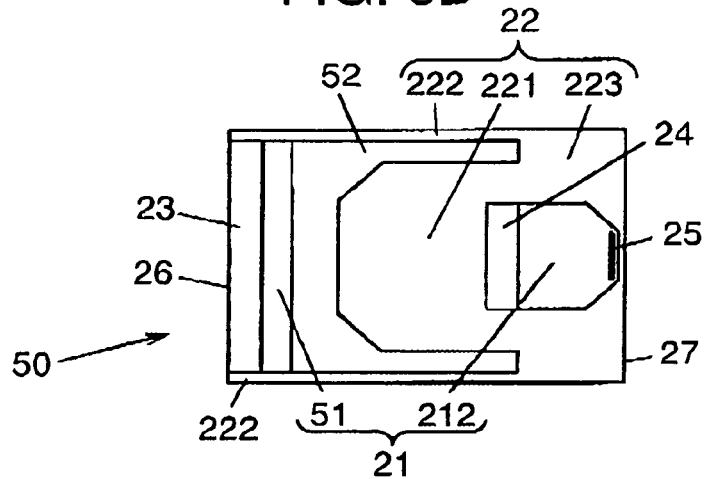
FIG. 6B is a plan view of a head slider according to the first exemplary embodiment of the invention, but having a further configuration.
Figure 6C:
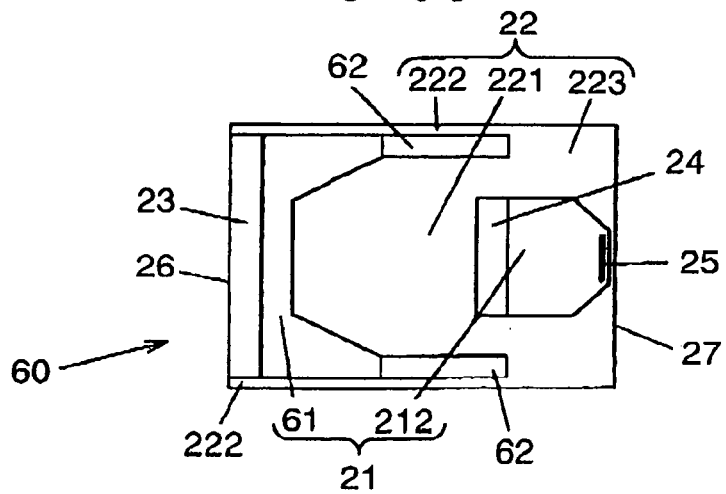
FIG. 6C is a plan view of a head slider according to the first exemplary embodiment of the invention, but having a still further configuration.

Relationships between values of $L_0/L_s$, and values of shock resistance, are obtained on head sliders having other various forms of the opposite-to-disk surface. Three types of these opposite-to-disk surfaces are shown in FIG. 6A to FIG. 6C. Head slider 40 shown in FIG. 6A (hereinafter called type A) has a stripe-shaped first positive pressure generating section 41 surrounded by first intermediate-level surface 23 extended from front end portion 26, and third intermediate-level surface 42 having rails on both sides thereof. Different points of this head slider from head slider 20 of the first exemplary embodiment are that first positive pressure generating section 41 is stripe-shaped and widely arranged at a position close to front end portion 26 and that negative pressure generating section 221 is formed of an area chiefly surrounded by third intermediate-level surface 42. Therefore, a center of positive pressure generated by first positive pressure generating section 41 is located somewhat closer to the front end portion than is a corresponding center of positive pressure generated in head slider 20 of the first exemplary embodiment.

Head slider 50 shown in FIG. 6B (hereinafter called type B) is different from head slider 20 of the first exemplary embodiment in that first positive pressure generating section 51 is a stripe form sandwiched between first intermediate-level surface 23 and U-shaped third intermediate-level surface 52, and that negative pressure generating section 221 is in an area surrounded by third intermediate-level surface 52. Because of this configuration, negative pressure generating section 221 and positive pressure generating section 21 can be designed to have their respective suitable values independent of each other and, therefore, a fixed point can be easily set at any desired spatial position. Accordingly, in type B (50), a center of positive pressure generated by first positive pressure generating section 51 is located slightly closer to the front end portion than is a corresponding center of positive pressure generated in head slider 20 of the first exemplary embodiment, and spring stiffness of a viscous fluid film formed in this area becomes somewhat smaller.

Head slider 60 shown in FIG. 6C (hereinafter called type C) is different from head slider 20 of the first exemplary embodiment in that first positive pressure generating section 61 is shifted toward the front end portion, that an area of negative pressure generating section 221 is larger, and that side rails provided on both sides are turned into a third intermediate-level surface 62 in a middle of the side rails. Accordingly, a center of positive pressure generated by first positive pressure generating section 61, and a center of negative pressure generated by negative pressure generating section 221, are positioned somewhat closer to the front end portion than are corresponding centers of positive pressure and negative pressure generated in the first exemplary embodiment. Therefore, in type C (60), a point of application of load is similarly shifted toward the front end portion, to thereby locate a point of application of negative pressure generated by the negative pressure generating section closer to the rear end portion 27 than is the point of application of the load.

Values of $L_0/L_s$ and values of shock resistance of the above-described three kinds of head sliders (types A, B and C) are shown in Table 2.

TABLE 2

|  | $L_0/L_s$ | Value of Shock Resistance: G |
|---|---|---|
| Type A | 0.7 | 900 |
| Type B | 1.6 | 870 |
| Type C | 1.8 | 800 |

As seen from Table 2, values of $L_0/L_s$ throughout type A, type B, and type C are within a range from 0.7 to 1.8, and corresponding values of shock resistance are within a range from 800 G to 900 G.

Figure 7:
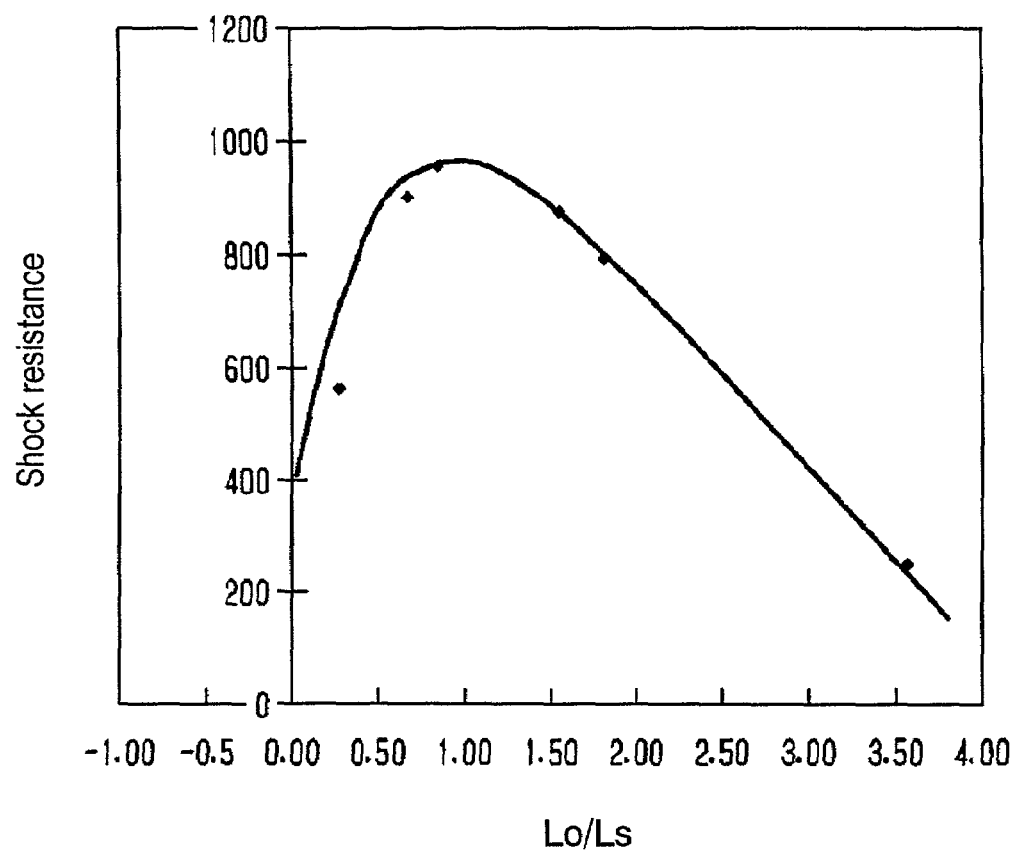
FIG. 7 is a graph showing a relationship between $L_0/L_s$ and shock resistance in the head slider of the first exemplary embodiment.

FIG. 7 shows a relationship between values of $L_0/L_s$ and values of shock resistance obtained from head sliders having various forms of opposite-to-disk surfaces. In a domain of values of $L_0/L_s$ being 0.5 or below, not only does a value of shock resistance sharply fall, but also variation of the value of shock resistance increases. This is so because, as described above, a negative pitch angle tends to occur upon application of a shock force to the head slider when the head slider has fixed point G positioned inwardly from the rear end portion of the head slider. Therefore, the value of $L_0/L_s$ is desired to be larger than 0.5. On the other hand, when $L_0/L_s$ becomes 1, a value of shock resistance reaches its maximum, and when $L_0/L_s$ becomes greater than 1, shock resistance decreases virtually linearly. When installing a disk drive on portable equipment, it is desired that value of shock resistance be as large as possible. As is apparent from FIG. 7, in order to obtain a value of shock resistance larger than 750 G, $L_0/L_s$ is required to be below 2.0, and to obtain a value larger than 650 G, $L_0/L_s$ is required to be below 2.4. From these results, if opposite-to-disk surfaces whose value of $L_0/L_s$ is set within a range of 0.5 to 2.0 are produced, disk drives having sufficient shock resistance as portable equipment can be realized. So long as the value of $L_0/L_s$ is 2.4 or below, shock resistance can be much improved over that in conventional disk drives.

Although the present exemplary embodiment has been described as one in which load from a suspension is applied to a head slider, the invention is possible even if only mass of the head slider itself is received as the load, in which case point of application of the load agrees with center of gravity of the head slider. It is also possible to apply the load to a position that is different from the center of gravity of the head slider. In such case, point of application of the load can be set at a balancing point between load from the suspension and center of gravity of the head slider. When point of application of the load is set to agree with center of gravity of the head slider, inertial force acting at a time of application of a shock force is applied to the center of gravity of the head slider. Therefore, variation of pitch angle hardly occurs even if there are some processing variations due to such errors as mounting error of the suspension on the head slider. Thus, allowance for designing the opposite-to-disk surface can be increased.

Second Exemplary Embodiment

A head slider of a second exemplary embodiment will be described below. Outward appearance of this exemplary embodiment is similar to that of the head slider shown in FIG. 1A and FIG. 1B. However, the head slider of the second exemplary embodiment is different in that slider length, width, and thickness are set to 1.30 mm, 1.05 mm, and 0.30 mm, respectively, and, further, in that difference in level between positive pressure generating section 21 and first and second intermediate-level surfaces 23, 24 is set to 0.1 µm, and difference in level between positive pressure generating section 21 and lower-level surface 22 is set to 1.2 µm. Head slider 35 will be called the second exemplary embodiment. Head slider 35 can also be used by being mounted on a head supporter and disk drive, as with the first exemplary embodiment. Head sliders in forms as shown in FIG. 8A and FIG. 8B were produced for sake of comparison with the second exemplary embodiment, of which sizes were also set to be the same as those described above. These head sliders will be called comparative example 3 and comparative example 4.

Figure 9:
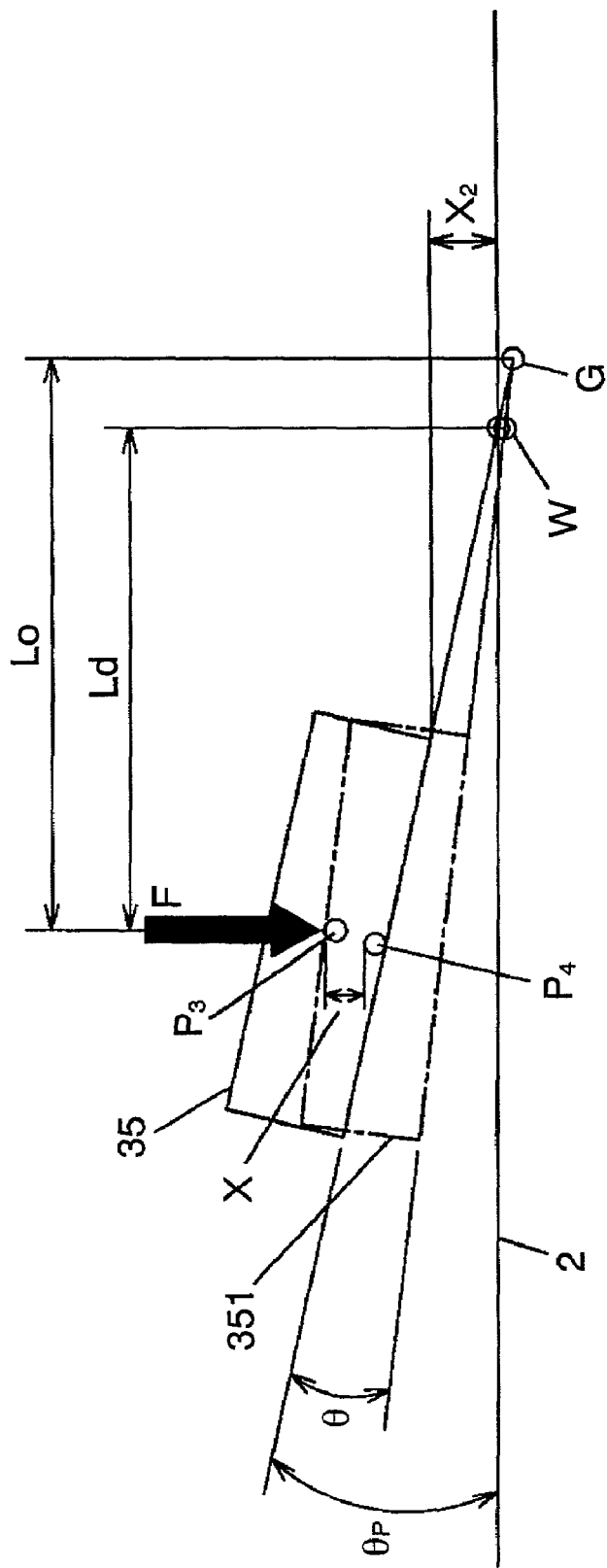
FIG. 9 is an explanatory drawing of a principle of absorption of shock force performed in a head slider of a second exemplary embodiment of the invention

For each of the second exemplary embodiment, comparative example 3, and comparative example 4, fixed point G acting as a center of rotation in a pitch direction when a shock force is externally applied to a corresponding head slider was obtained in a form of distance $L_0$ from a point of application of a load. Further, from pitch angle $\theta_p$ and flying height $X_2$ at a rear end portion of the head slider in a steadily flying state, intersection of an extended line from an opposite-to-disk surface and a disk surface was obtained, and thereby distance $L_d$ from the point of application of the load was determined. A method for obtaining $L_0$ and $L_d$ will be described with reference to FIG. 9. A state of head slider 35 flying over disk 2 with pitch angle $\theta_p$ and flying height $X_2$ at a rear end portion of the head slider is indicated by full lines, and a state of head slider 351 displaced by a vertical displacement of x and an angular displacement of $\theta$ upon application of shock force F to head slider 35 is indicated by chain-dotted lines. Fixed point G is indicated, as shown in FIG. 9, by intersection of extended lines of the opposite-to-disk surfaces of head slider 35 in its steadily flying state and of head slider 351 having been displaced by being subjected to the shock force. Point of load application $P_3$ corresponds to the center of gravity of head slider 35 and this point agrees with a center along a length of the head slider. A load from a suspension (not shown) is also applied at this point. Distance $L_0$ from the point of load application to head slider 35, in its state flying over disk 2 under the above-described conditions, to fixed point G can be obtained in the same way as corresponding distance $L_0$ in the first exemplary embodiment was obtained, and hence description thereof will be omitted here.

A method for obtaining distance $L_d$ from point of load application $P_3$ to intersection W of an extended line from the opposite-to-disk surface and the surface of the disk will be described below. Since pitch angle $\theta_p$ is very small and, hence, it is considered that $\cos \theta_p \approx 1$, $L_d$ can be obtained from the following Equation (5):

$$L_d = \frac{L_s}{2} + \frac{X_2}{\tan(\theta_p)}. \tag{5}$$

The value $L_d$ can be univocally obtained because pitch angle $\theta_p$ and flying height $X_2$ can be determined by setting a form of the opposite-to-disk surface of the head slider, disk rotating speed, the equivalent mass, and the like. For example, in the case of the second exemplary embodiment, pitch angle $\theta_p$ is 70 µrad and $X_2$ is 13 nm when the head slider is flying over the disk surface. By substituting these values and length $L_s$ of the head slider into Equation (5), $L_d$ can be obtained.

Further, values of shock resistance were obtained under the same conditions as in the first exemplary embodiment. Results of ratios $L_0/L_d$ and values of shock resistance obtained for the second exemplary embodiment, comparative example 3, and comparative example 4 are shown in Table 3:

TABLE 3

|  | $L_0/L_d$ | Value of Shock Resistance: G |
|---|---|---|
| Second Exemplary Embodiment | 1.15 | 800 |
| Comparative Example 3 | 6.07 | 250 |
| Comparative Example 4 | 0.89 | 410 |

As seen from Table 3, value $L_0/L_d$ was 1.15 and value of shock resistance was approximately 800 G for the second exemplary embodiment. Value $L_0/L_d$ was 6.07 and value of shock resistance was approximately 250 G for comparative example 3, while value $L_0/L_d$ was 0.89 and value of shock resistance was approximately 410 G for comparative example 4.

Figure 10A:
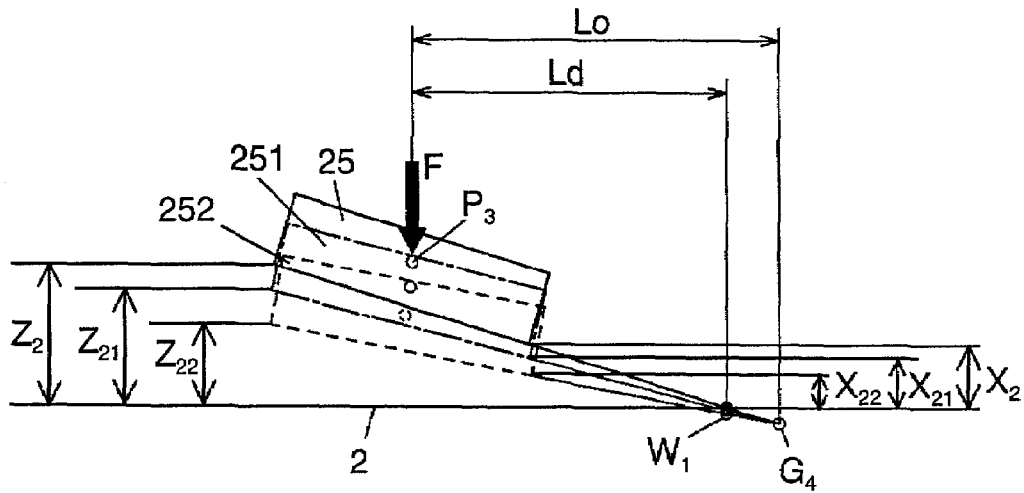
FIG. 10A is an explanatory drawing of operation of the head slider of the second exemplary embodiment in response to a shock force applied thereto.

Description about these results will be given with use of schematic diagrams of FIG. 10A to FIG. 10C. In the case of head slider 35 of the second exemplary embodiment shown in FIG. 10A, the head slider is in flight with a flying height of $X_2$ with respect to surface of disk 2 at a rear end portion of the head slider and at a positive pitch angle as illustrated. When shock force F is applied to head slider 35 in this state, the same is displaced to the position indicated by head slider 351. At this time, though displacement ($Z_2$–$Z_{21}$) at a front end portion of the head slider is greater than displacement ($X_2$–$X_{21}$) at the rear end portion, a positive pitch angle is maintained. If a greater shock force F is applied, the head slider is displaced to a position indicated by head slider 352. Even in this condition, the head slider maintains a positive pitch angle ($Z_{22}$>$X_{22}$), and hence a viscous fluid film is not broken and maintains its spring stiffness. Accordingly, collision between the head slider and disk can be prevented, or even if a collision occurs, energy at a time of collision is small and hence damage hardly occurs. This effect is obtained by virtue of designing the form of the opposite-to-disk surface such that distance $L_0$, from load application point $P_3$ to fixed point $G_4$, is 1.15 times as long as distance $L_d$, from load application point $P_3$ to intersection point $W_1$.

Figure 10B:
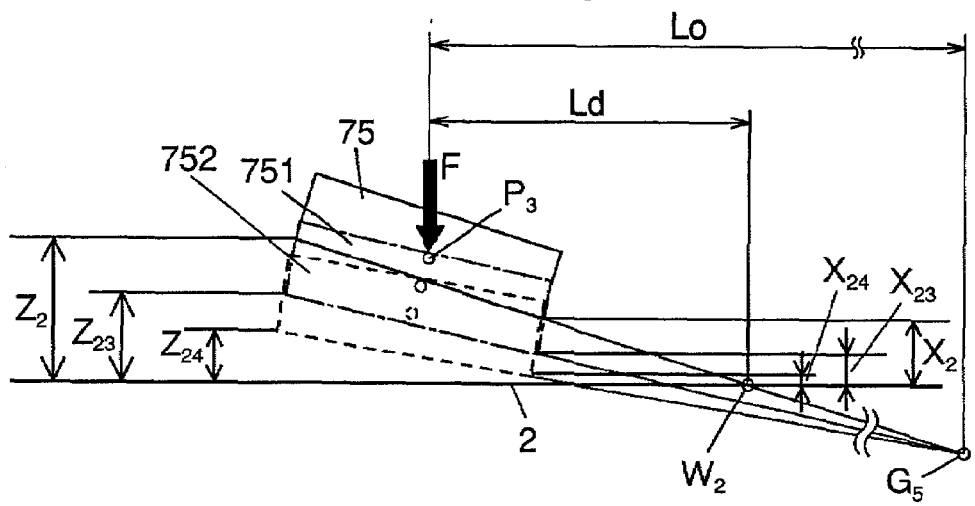
FIG. 10B is an explanatory drawing of operation of a head slider of a third comparative example in response to a shock force applied thereto.

A schematic diagram of the case of comparative example 3 is shown in FIG. 10B. When shock force F is applied to head slider 75 of comparative example 3, the head slider is displaced to a position indicated by head slider 751. Namely, displacement at a front end portion and displacement at the rear end portion, of the head slider, become virtually equal (($Z_2$–$Z_{23}$)≈($X_2$–$X_{23}$)). A reason for occurrence of such displacements is that distance $L_0$, from load application point $P_3$ to fixed point $G_5$, is 6.07 times as long as distance $L_d$, from load application point $P_3$ to intersection point $W_2$. More specifically, when the distance from the load application point to the fixed point is so long as in this case, head slider 75 produces virtually no rotational displacement in a pitch direction when it is subjected to shock force F, and only produces a vertical displacement. Therefore, the head slider is displaced to a position indicated by head slider 752 by application of a small shock force, to thereby cause the rear end portion of the head slider to collide with the disk.

Figure 10C:
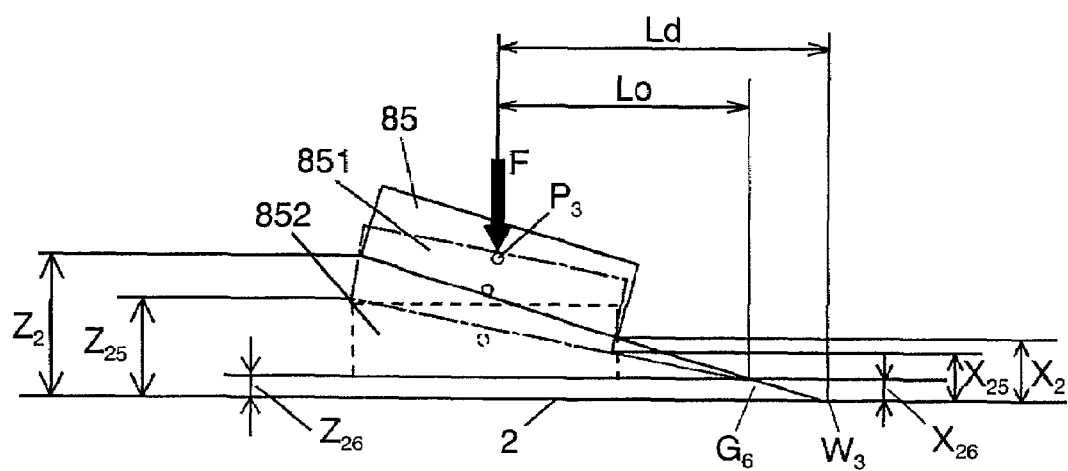
FIG. 10C is an explanatory drawing of operation of a head slider of a fourth comparative example in response to a shock force applied thereto.

A schematic diagram of the case of comparative example 4 is shown in FIG. 10C. In the case of head slider 85 in comparative example 4, ratio $L_0/L_d$ is 0.89 and fixed point $G_6$ is located closer to the head slider than is intersection point $W_3$. Even if the head slider is displaced to a position indicated by head slider 851 upon application thereto of shock force F, the head slider is prevented from colliding with the disk and, in this case, shock resistance is improved relative to that in the case of head slider 75 of comparative example 3. However, if a still greater shock force is applied, flying height at a front end portion of the head slider ($Z_{26}$) becomes smaller than flying height at a rear end portion of the head slider ($X_{26}$) and, hence, a viscous fluid film of viscous fluid is not formed and spring stiffness becomes lost.

As is apparent from the description made above with the use of schematic diagrams, by optimally setting the position of fixed point G, it is possible to obtain a head slider with high shock resistance.

Relationships between values of $L_0/L_d$ and values of shock resistance are obtained also with regard to head sliders having forms of opposite-to-disk surfaces as shown in FIG. 6A to FIG. 6C. However, external sizes and arrangement of steps were made the same as in head slider 35 of the second exemplary embodiment. These head sliders will be called type D, type E, and type F. Values of $L_0/L_d$ and values of shock resistance were obtained as shown in Table 4:

TABLE 4

|  | $L_0/L_d$ | Value of Shock Resistance: G |
|---|---|---|
| Type D | 1.05 | 770 |
| Type E | 1.36 | 770 |
| Type F | 1.81 | 720 |

As is apparent from Table 4, throughout type D, type E, and type F, $L_0/L_d$ was within the range from 1.05 to 1.81 and shock resistance was within a range from 720 to 770 G.

Figure 11:
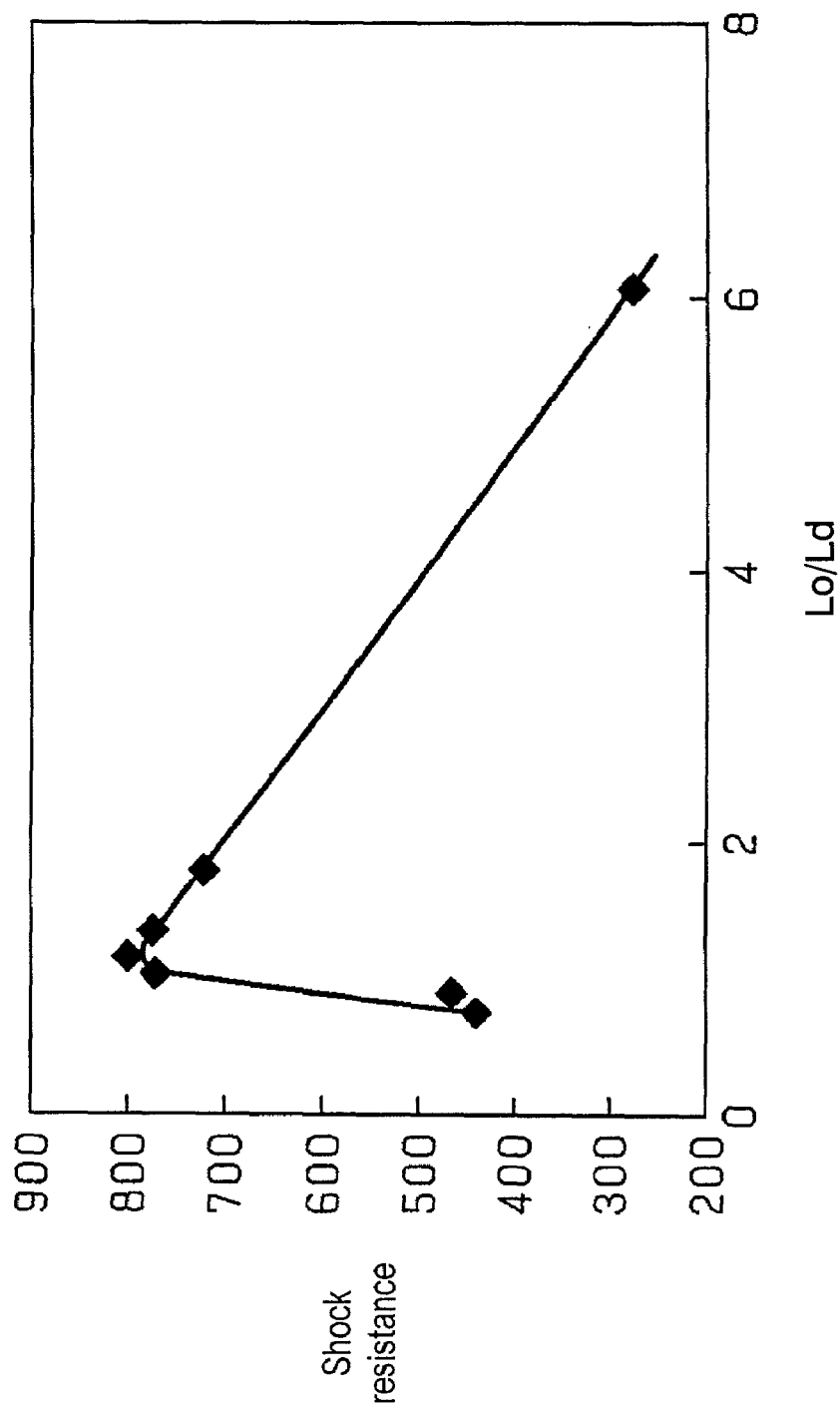
FIG. 11 is a graph showing a relationship between $L_0/L_d$ and shock resistance in the head slider of the second exemplary embodiment.

FIG. 11 shows results of findings of a relationship between $L_0/L_d$ and shock resistance with use of the head sliders having various forms of opposite-to-disk surfaces as described above (i.e. types D–F). In a domain in which $L_0/L_d$ is 1.0 or below, not only does a value of shock resistance sharply drop but also, in this domain, fluctuation of the value of shock resistance increases. This is because, in the case where the position of fixed point G is shifted from the position of intersection point W toward the head slider, such a phenomenon tends to occur in that the head slider comes to have a negative pitch angle when subjected to a shock force. Such a position of fixed point G is obtained when spring stiffness of viscous fluid film on the rear end portion of the head slider is greater than that on the front end portion of the head slider. On the other hand, if spring stiffness of the viscous fluid film on the front end portion of the head slider is made greater than that on the rear end portion of the head slider, then distance from a load application point to fixed point G becomes greater than the distance from the load application point to intersection point W. When such a head slider is subjected to a shock force, only a vertical displacement occurs while no displacement of a pitch angle occurs and, hence, a value of shock resistance equally decreases. Thus, a large value of shock resistance can be obtained in a domain in which distance $L_0$, determined by film stiffness at the front end portion and at the rear end portion, of the head slider, has a certain ratio with respect to distance $L_d$.

Even if $L_0/L_d$ is below 1.0, head sliders having great values of shock resistance can be obtained. However, as seen from FIG. 11, variation of values of shock resistance becomes larger. Therefore, in order to obtain stabilized characteristics in this domain, it is required to greatly decrease fluctuations at a time of fabrication of the head slider. On the other hand, in a domain in which $L_0/L_d$ is 1 or above, value of shock resistance decreases virtually linearly. Hence, relatively large allowance for fabrication variation can be obtained. However, when $L_0/L_d$ becomes greater than 2.5, value of shock resistance becomes lower than 650 G or thereabout, which shock resistance value of 650 G is required of a component to be mounted on portable equipment. In view of these points, an optimal range of $L_0/L_d$ is from 1 to 2.5 inclusive.

Although a case where load from a suspension is applied to the head slider has been described with regard to the present exemplary embodiment, the invention may be of such a structure in which only mass of the head slider itself serves as a load. In such case, point of application of the load agrees with center of gravity of the head slider. Alternatively, such a structure may also be possible in which load is applied at a position different from center of gravity of the head slider. In such case, point of application of the load will be set at a balancing point between load from a suspension and center of gravity of the head slider.

The present invention is not limited to the forms of opposite-to-disk surfaces described in the present exemplary embodiment. The form is not particularly limited provided that the form of the head slider has a fixed point at a predetermined outer position.

Third Exemplary Embodiment

Figure 12:
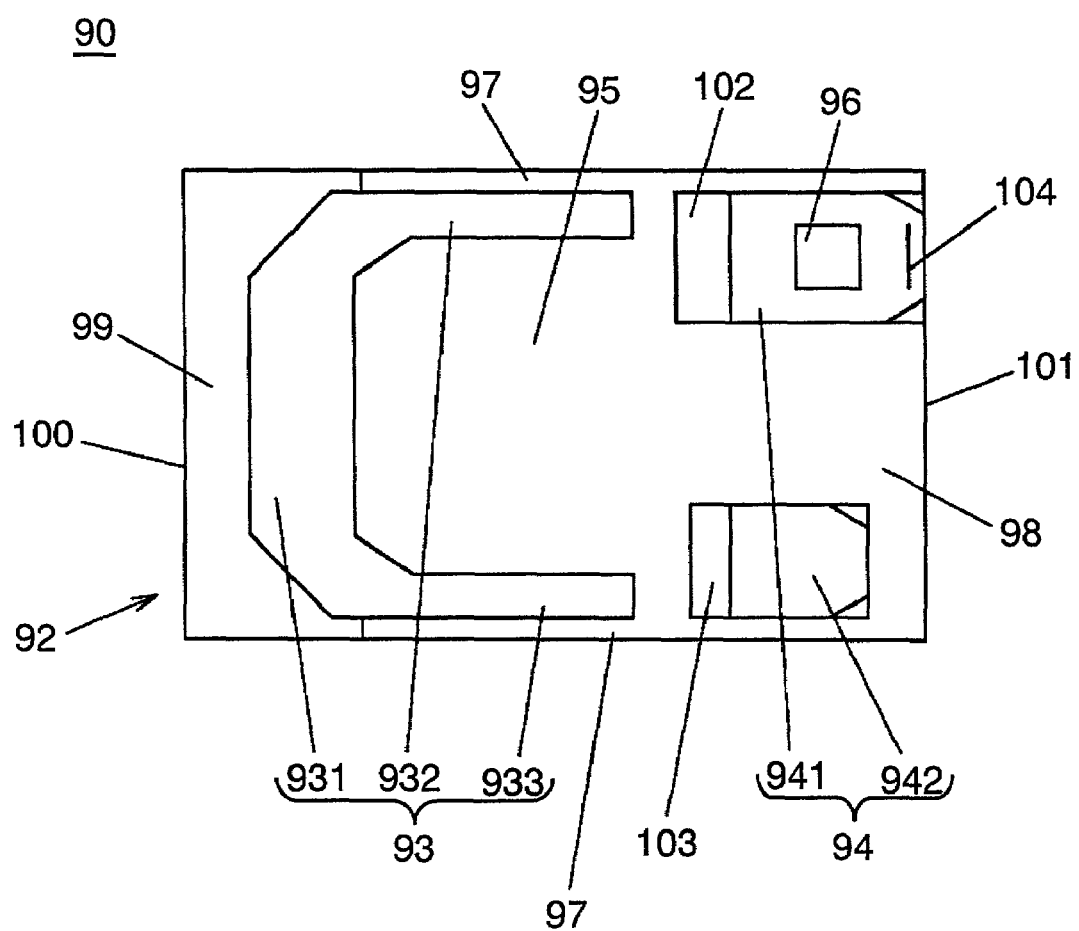
FIG. 12 is a plan view of a head slider of a third exemplary embodiment.

FIG. 12 shows a form of an opposite-to-disk surface of a head slider according to a third exemplary embodiment. Head slider 90 is virtually of a rectangular parallelepiped shape. A main portion of opposite-to-disk surface 92 is formed of first positive pressure generating section 93, a second positive pressure generating section 94, negative pressure generating section 95 surrounded by these positive pressure generating sections 93, 94, and arranged to have a deep recess relative to the positive pressure generating sections, and transducer 104 provided on positive pressure generating section 941 on one side of second positive pressure generating section 94.

First positive pressure generating section 93 is formed of positive pressure rail 931 arranged in a direction perpendicular to a viscous fluid flow produced by the rotation of a disk, i.e., in a direction parallel to a width of the head slider, and side rails 932, 933 arranged on both lateral sides of the head slider so as to be connected with positive pressure rail 931. More particularly, positive pressure rail 931 is formed of a portion arranged parallel to a lateral direction so as to have an elevation in level, via a step, from an edge portion of first intermediate-level surface 99, and diagonal portions for connecting the parallel portion to both side rails 932, 933.

Second positive pressure generating section 94 is made up of positive pressure generating section 941 on one side thereof, and positive pressure generating section 942 on another side thereof, which are formed of a hexagonal shape, as illustrated, and disposed on a side toward rear end portion 101 of the head slider, and close to both lateral sides of the head slider, respectively. On a side, toward front end portion 100 of the head slider, of positive pressure generating sections 941, 942, there are provided second intermediate-level surfaces 102, 103, respectively. Second intermediate-level surfaces 102, 103 are at the same level as first intermediate-level surface 99, and the second intermediate-level surfaces have shallower recesses relative to that of negative pressure generating section 95, when first positive pressure generating section 93 and second positive pressure generating section 94 are taken as a reference. Incidentally, first positive pressure generating section 93 and second positive pressure generating section 94 are at the same level.

Further, positive pressure generating section 941 on one side of second positive pressure generating section 94 is made larger in area than positive pressure generating section 942 on the other side of the second positive pressure generating section 94. Further, positive pressure generating section 941 has second negative pressure generating section 96 formed therein by removing a square portion thereof. This second negative pressure generating section 96 is formed lower in level than second intermediate-level surface 102, and a bottom of second negative pressure generating section 96 is formed virtually at the same level as negative pressure generating section 95.

There are also provided, at the same level as negative pressure generating section 95, side-lower-level surfaces 97 disposed on outer lateral sides of side rails 932, 933, and rear-lower-level surface 98, disposed between the two positive pressure generating sections 941, 942, of second positive pressure generating section 94, for allowing viscous fluid to flow out therethrough.

In the present exemplary embodiment, the difference in level between first and second positive pressure generating sections 93, 94, and first and second intermediate-level surfaces 99, 102, and 103 is set to 0.08 μm, and the difference in level between the aforesaid positive pressure generating sections 93, 94, and negative pressure generating section 95 is set to 1.0 μm, while an overall size of head slider 90 is set to 1.24 mm in length, 1.00 mm in width, and 0.3 mm in thickness.

Figure 13:
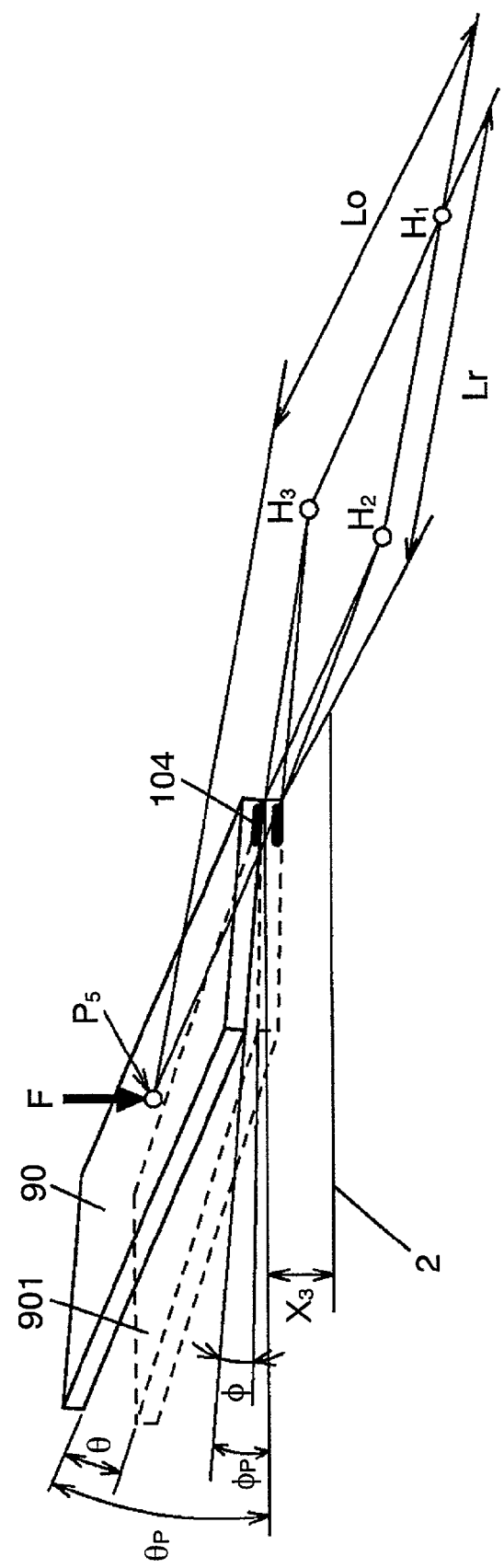
FIG. 13 is an explanatory drawing of a principle of absorption of shock force performed in the head slider of the third exemplary embodiment.

Head slider 90, as with the head slider of the first exemplary embodiment, can be mounted on a suspension and driven by a disk drive as shown in FIG. 2 and FIG. 3. A flying attitude of the head slider over a disk surface, when the disk drive is driven, and a method for determining distance to a fixed point from the flying attitude will be described with reference to FIG. 13.

A state of head slider 90 flying over disk 2 with pitch angle $\theta_p$, roll angle $\Phi_p$, and flying height $X_3$ at a rear end portion of the head slider where transducer 104 is disposed is indicated by solid lines. A displaced state of head slider 90, after application of shock force F to point of application $P_5$, displaying displacement x in a vertical direction (not shown) and angular displacements $\theta, \Phi$ in a pitch direction and roll direction, respectively, is indicated as head slider 901 by dotted lines.

Fixed point $H_1$, as illustrated, can be obtained as an intersection of rectangular coordinates in which a distance to fixed point $H_2$ when the head slider rotates in the pitch direction, and a distance to fixed point $H_3$ when the head slider is rotated in the roll direction, are used as respective coordinate values. Here, fixed point $H_2$ in the pitch direction and fixed point $H_3$ in the roll direction can be obtained in the below described manner with application point $P_5$ taken as a reference. Since both $\theta_p$ and $\Phi_p$ are very small, it is considered that $\cos \theta_p \approx 1$ and $\cos \Phi_p \approx 1$. Therefore, the following approximation can be made.

Distance $L_0$ from application point $P_5$ to fixed point $H_2$ in the pitch direction can be approximated with the use of the following Equation (1), as in the first exemplary embodiment:

$$L_0 = \frac{x}{\theta}. \quad (1)$$

Likewise, distance $L_r$ from application point $P_5$ to fixed point $H_3$ in the roll direction can be approximated with the use of the following Equation (6):

$$L_r = \frac{x}{\varphi}. \quad (6)$$

On the other hand, if displacement produced by application of external shock force F is assumed to be expressed by values of rotation around application point $P_5$ and a value of translation at application point $P_5$ in a direction of the disk, then by representing displacement in a vertical direction toward disk 2 by x, displacement in the pitch direction by $\theta$, and displacement in the roll direction by $\Phi$, with application point $P_5$ taken as a reference, the following Equation (7) can be obtained:

$$\begin{pmatrix} k_{11} & k_{12} & k_{13} \\ k_{21} & k_{22} & k_{23} \\ k_{31} & k_{32} & k_{33} \end{pmatrix} \begin{pmatrix} X \\ \theta \\ \varphi \end{pmatrix} = \begin{pmatrix} F \\ 0 \\ 0 \end{pmatrix}, \quad (7)$$

where $k_{mn}$ (m, n are integers from 1 to 3) denote moduli of stiffness when a viscous fluid film between head slider 90 and disk 2 acts as a spring. Of these moduli of stiffness, $k_{11}$ is vertical stiffness, $k_{22}$ is rotational stiffness in the pitch direction, and $k_{33}$ is rotational stiffness in the roll direction. Additionally, other than diagonal components, i.e., $k_{12}$ and $k_{21}$, for example, are modulus of force in rotational direction generated when head slider 90 moves in a direction perpendicular to disk 2 and modulus of force in a vertical direction generated by rotational movement, respectively. By transforming the above equation, the following Equation (8) is obtained:

$$\begin{pmatrix} x \\ \theta \\ \varphi \end{pmatrix} = \begin{pmatrix} G_{11} & G_{12} & G_{13} \\ G_{21} & G_{22} & G_{23} \\ G_{31} & G_{32} & G_{33} \end{pmatrix} \begin{pmatrix} F \\ M_\theta \\ M_\varphi \end{pmatrix}. \quad (8)$$

Accordingly, distance $L_0$, from application point $P_5$ to fixed point $H_2$, can be expressed, from Equation (1) and Equation (8), as the following Equation (9). Also, distance Lr to fixed point $H_3$, can be expressed, from Equation (6) and Equation (8), as the following Equation (10). Here, $G_{11}$, $G_{21}$, and $G_{31}$ are inverses of vertical stiffness $k_{11}$ of spring stiffness of viscous fluid film, rotational stiffness $k_{22}$ in the pitch direction, and rotational stiffness $k_{33}$ in the roll direction, respectively; namely moduli of displacements due to force, or moduli indicating flexibility in each direction (called modulus of force). Incidentally, since, $G_{11}$, $G_{21}$, and $G_{31}$ are inverses of $k_{11}$, $k_{22}$, and $k_{33}$, respectively, as described above, Equation (9) is equivalent to Equation (4).

$$L_0 = \frac{x}{\theta} = -\frac{G_{11}}{G_{21}}, \quad (9)$$

$$L_r = \frac{x}{\varphi} = -\frac{G_{11}}{G_{31}}. \quad (10)$$

The above moduli of force $G_{11}$, $G_{21}$, and $G_{31}$ can be univocally obtained if such factors as form of opposite-to-disk surface of the head slider, rotating speed of the disk, and equivalent mass are determined. By compositing the above two values $L_0$ and $L_r$ as coordinates, a distance from application point $P_5$ to fixed point $H_1$ can be determined.

In determining a position of fixed point $H_1$, when distance $L_0$ in the pitch direction and distance $L_r$ in the roll direction are defined as above, and head slider length $L_s$ and slider width $W_s$ are used, it is desired that the position of fixed point $H_1$ be located, by using $L_0$ and $L_r$, in ranges of $0.5 < L_0/L_s \leq 2.5$ and $0.5 < L_r/W_s \leq 2.5$.

More specifically, when $L_0/L_s > 2.5$ and $L_r/W_s > 2.5$, the following disadvantage arises. That is, when fixed point $H_1$ is expressed as a distance from rear end portion 101 of positive pressure generating section 941, fixed point $H_1$ comes to be located away from rear end portion 101 by more than two times the length $L_s$ and width $W_s$. When a head slider having such fixed-point positions is subjected to a shock force, though it rotates around the fixed points as centers of rotations in a pitch direction and in a roll direction with angles being maintained positive, angular displacements are very small. Hence, in substance, only produced is a displacement virtually parallel to a vertical direction. Therefore, the rear end portion of the head slider collides with the disk even under a relatively small shock force and thus damages either the disk or the head slider. Therefore, a head slider assembly cannot provide around 650 G of shock resistance, which amount of shock resistance is required of a head slider when it is mounted on portable equipment.

On the other hand, when $L_0/L_s \leq 0.5$ and $L_r/W_s \leq 0.5$, fixed point $H_1$ comes to be located at a rear end portion of positive pressure generating section 941 of head slider 90, or at a position closer to an interior of the head slider than the rear end portion. When fixed point $H_1$ is set in such a position, even if the head slider 90 is displaced to the position indicated by head slider 901 under application of shock force F, the head slider is prevented from colliding with the disk. However, if a greater shock force is applied, such a phenomenon occurs in that a flying height at the front end portion of the head slider becomes smaller than a flying height at the rear end portion of the head slider and, accordingly, formation of viscous fluid film between the opposite-to-disk surface and the disk surface is stopped. When such a phenomenon occurs, spring stiffness owing to the viscous fluid film disappears and, hence, the disk loses its flying power. Thus, collision of head slider 90 with the surface of disk 2 pitch results and head slider 90 or disk 2 is damaged. When such a negative pitch angle or a negative roll angle is produced, a value of shock resistance comes to be greatly affected by a slight variation of rotating speed of the disk, the skew angle, or load. Decrease in flying height leads to sudden damage. Hence, variation of the value of shock resistance becomes great. Thus, also when a head slider has fixed point $H_1$ located within a range as described above, the head slider is unable to assure a shock resistance value required of it when it is to be mounted on portable equipment.

As described above, distances $L_0$, $L_r$ to fixed points $H_2$, $H_3$, in the pitch direction and in the roll direction, respectively, are obtained from spring stiffness of viscous fluid film, and a position of composite fixed point $H_1$ is obtained from $L_0$, $L_r$ in the described manner. By designing an opposite-to-disk surface such that a position of fixed point $H_1$ is located a predetermined distance outwardly from a rear end portion of a head slider, a head slider having good shock resistance can be realized. The present exemplary embodiment has first positive pressure generating section 93 and second positive pressure generating section 94 disposed at the front end portion and the rear end portion, of the slider head, respectively. Further, the head slider is arranged such that positive pressure generated in positive pressure generating section 941 on one side, which has transducer 104 mounted thereon, is greater than positive pressure generated by positive pressure generating section 942 on the other side. When such head slider 90 is subjected to a shock force while flying over a disk surface, spring stiffness effectively works until a rear end portion at which transducer 104 is mounted comes into contact with disk 2. Because of this spring stiffness, head slider 90 is allowed to make rotational displacements in both a pitch direction and a roll direction to absorb the shock force. Further, since head slider 90 of the third exemplary embodiment has first positive pressure generating section 93 provided with side rails, the side rails also generate positive pressure. This positive pressure generated by the side rails has two peaks in a lateral direction of the head slider, thereby improving stability of the head slider against variation of roll angle.

Figure 14:
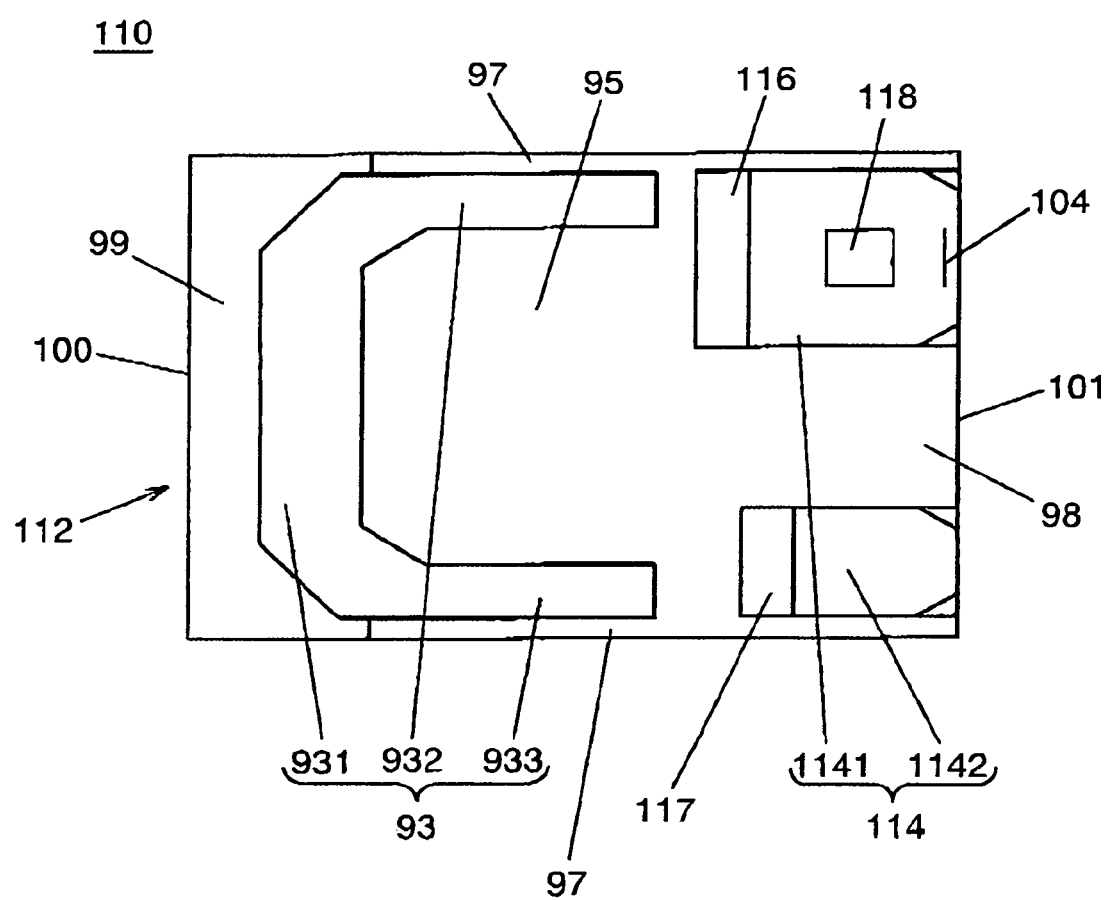
FIG. 14 is a plan view showing a modified example of a head slider of the third exemplary embodiment.

In the present exemplary embodiment, there is provided negative pressure generating section 96 within positive pressure generating section 941. By virtue of this arrangement, while positive pressure is increased and spring stiffness is enhanced accordingly, a flying height, at the rear end portion on the side where transducer 104 is mounted, is reduced. This invention is not limited to such structure. For example, a head slider may have an opposite-to-disk surface as shown in FIG. 14, in which similar components to those in FIG. 12 are denoted by similar reference numerals. In opposite-to-disk surface 112 of head slider 110 shown in FIG. 14, both of positive pressure generating section 1141, on one side, and positive pressure generating section 1142, on another side, of second positive pressure generating section 114, are extended rearwardly to reach an edge of rear end portion 101, positive pressure generating section 1141 is made larger in area than positive pressure generating section 1142, and second negative pressure generating section 118 is provided within positive pressure generating section 1141. Further, a distance between second intermediate-level surface 117 and side rail 933 is made larger than a distance between second intermediate-level surface 116 and side rail 932. Because of such an arrangement, a center of negative pressure generated in negative pressure generating section 95 is shifted toward a position where transducer 104 is disposed. By virtue of this shifted center of negative pressure, and provision of second negative pressure generating section 118, a flying height on a side of rear end portion 101 where transducer 104 is disposed can be maintained at a minimum even if positive pressure generated by positive pressure generating section 1141 is increased.

Figure 15:
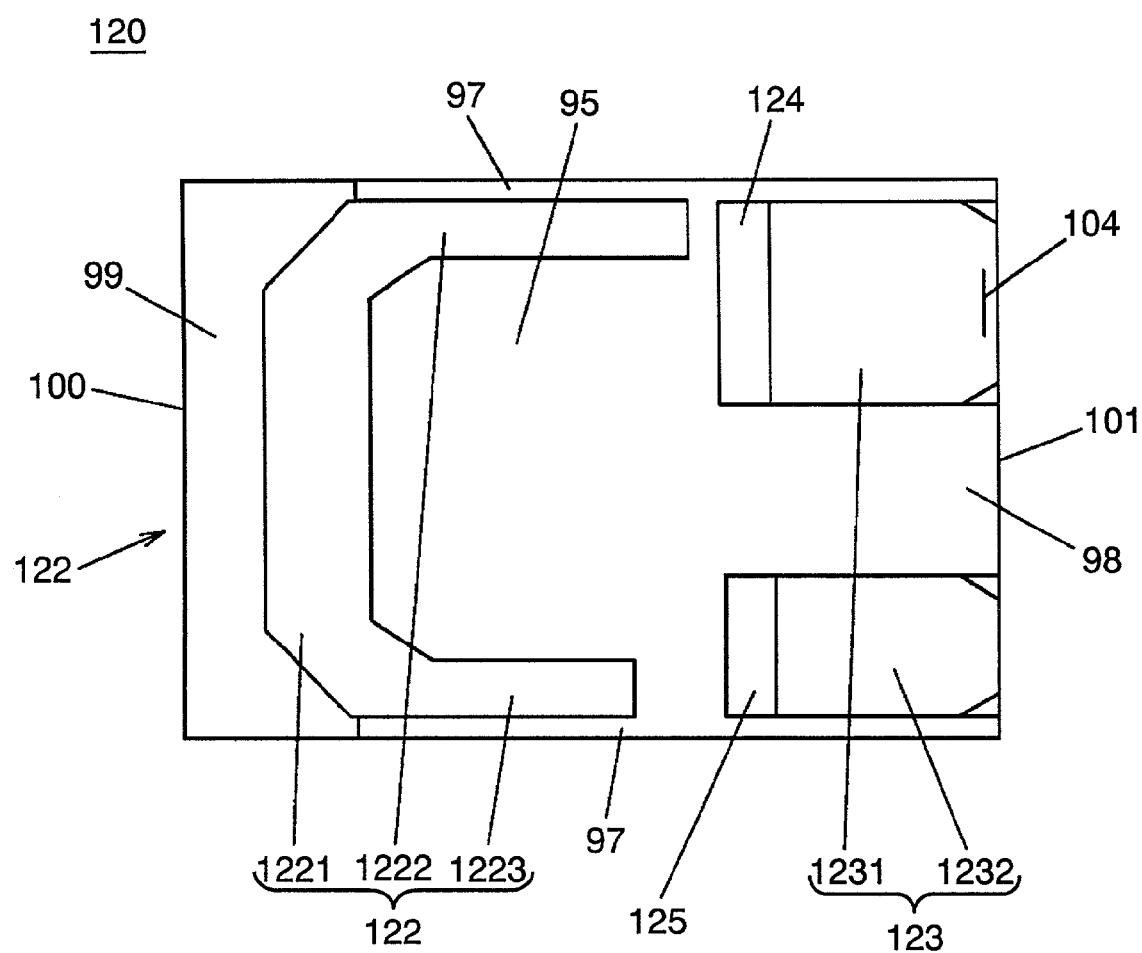
FIG. 15 is a plan view showing another modified example of the head slider of the third exemplary embodiment.

In opposite-to-disk surface 122 of head slider 120 shown in FIG. 15, positive pressure generating section 1231, on one side of second positive pressure generating section 123, is made larger in area than positive pressure generating section 1232 on another side of second positive pressure generating section 123, and, in addition, section 1231 is 10 nm higher than section 1232. Further, with reference to positive pressure rail 1221 and side rails 1222, 1223 whereby first positive pressure generating section 122 is composed, a distance between side rail 1222 and positive pressure generating section 1231 is shorter than a distance between side rail 1223 and positive pressure generating section 1232. On account of such configuration, positive pressure generated by positive pressure generating section 1231 is increased, and in the meantime, a center of negative pressure generated by negative pressure generating section 95 is shifted toward the side of transducer 104 so that a predetermined angle of inclination can be provided.

Also, a point of application at which a load from a suspension is applied to the head slider may be shifted from a center of gravity of head slider toward the side of the transducer so that a predetermined angle of inclination is obtained.

In the present exemplary embodiment, a positive pressure generating section on one side of second positive pressure generating section, and a positive pressure generating section on another side of second positive pressure generating section, both were formed of a virtually hexagonal shape. Of course, these positive pressure generating sections may be of a square or other polygonal shape. Further, although a second negative pressure generating section provided within the positive pressure generating section on the one side of second positive pressure generating section was made of a square shape in the present exemplary embodiment, this shape is not limited. Additionally, the positive pressure generating section on the one side of second positive pressure generating section may be divided in two by having a groove cut therein parallel to a lateral direction of the head slider.

Although the present exemplary embodiment has been described as having side rails attached to the first positive pressure generating section, such side rails are not absolutely necessary provided that predetermined spring stiffness can be obtained.

Although a distance to a fixed point has been obtained from spring stiffness of viscous fluid film in the present exemplary embodiment, the invention is not limited to such a method. Similar effects will be obtained if another method is used. Further, the head slider of the present exemplary embodiment is such that is mentioned by way of example, and the invention is not limited to the described configuration, provided that the opposite-to-disk surface is so designed as to have predetermined angles of inclination in both pitch and roll directions and able to absorb a shock force by rotating around a fixed point, taken as a center of rotation, located a predetermined distance outwardly from the head slider.

Fourth Exemplary Embodiment

Figure 16:
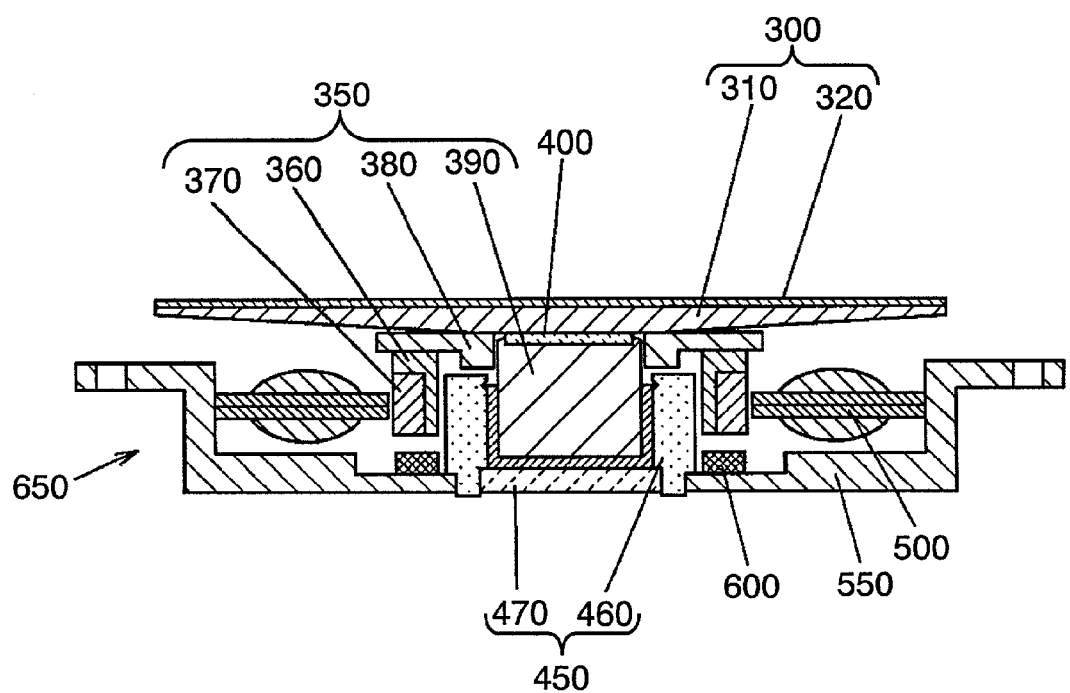
FIG. 16 is a sectional view showing another structure of the disk drive of the invention.

In the present exemplary embodiment, description will be made of a small, thin disk drive which can be mounted on portable equipment employing the above described head slider of the present invention. FIG. 16 is a sectional view of a main portion of a driving structure mounting thereon a magnetic disk having a magnetic recording layer formed on one side thereof, and having a sloped surface formed on another side thereof. Magnetic disk 300 has magnetic recording layer 320 formed on a planar surface on one side of disk substrate 310. Another side of disk substrate 310 is formed such that a disk thickness becomes gradually thinner from a center toward a circumference of the disk substrate. Drive structure 650, for which a spindle motor, for example, is used, has rotor 350 with rotating magnet 370 attached thereto, stator 500 arranged to be opposite rotating magnet 370, bearing section 450 for supporting rotor 350 about an axis for rotation, and frame 550 for securely fixing bearing section 450 and stator 500 thereto. Further, rotor 350 is formed of rotating table 380 having rotating magnet 370 attached thereto via back yoke 360, and shaft 390 fixed in rotating table 380. Bearing section 450 is constructed of a hydrodynamic bearing formed of radial bearing 460 and thrust bearing 470. Further, suction plate 600 formed of soft magnetic material, which is circularly arranged to oppose rotating magnet 370, is fixed onto frame 550 for preventing rotor 350 from being lifted from bearing section 450.

After a center of shaft 390, as a constituent of rotor 350, is aligned with a center of magnetic disk 300, magnetic disk 300 is fixed to drive structure 650 by adhesion via adhesion section 400.

Such a disk drive is made up of drive structure 650 with magnetic disk 300 attached thereto, a suspension with a head slider of the present invention fixed thereto, and an actuator for driving the same. This disk drive, in overall structure, is the same as the device shown in FIG. 2. Since recording and playback operation performed therein is the same as in conventional disk drives, description of the same will be omitted. As is apparent from the above description, the present disk drive is constructed of one disk and one piece of a transducer corresponding thereto. Accordingly, shock resistance of this disk drive can be certainly improved by the method as described above. Further, a smaller and thinner disk drive can be realized.

In the above described disk drive, equivalent mass of the head slider including mass of the suspension is 8 mg, a pitch angle $\theta_p$ of the head slider flying over a disk surface is 70 µrad, a flying height $X_2$ on a downstream side of the head slider is 13 nm, a load from the suspension is 2 gf, a rotating speed of the disk is 4500 rpm, and a skew angle is −5 degrees. When the load is set to be greater than 2 gf, though the head slider is prevented from jumping, positive force is required to be increased accordingly. To attain this, the head slider must be enlarged and, hence, contamination, particle dust, and the like tend to be easily entrained. When a head slider jumps upon application of a large shock force, possibility of its colliding with the disk becomes very great and a value of shock resistance tends to fluctuate. To suppress fluctuation of the value of shock resistance, it is desired that the load be set lower than 2 gf. Incidentally, such an arrangement is also possible where no load from the suspension is applied, and only mass of the head slider is used as the load.

Further, the smaller the sum of the mass of the head slider and the equivalent mass of the suspension, the less becomes occurrence of damage. This is so because, even if a large impulsive acceleration is applied, a shock force to be impressed on the head slider is small if mass is small. By setting a value of this mass to be less than 10 mg or, preferably, less than 8 mg, occurrence of damage can be prevented even when an impulsive acceleration of approximately 650 to 800 G is applied. Since material of the head slider and suspension are restricted, the sum of the masses of the head slider and suspension is at least 0.5 mg. Hence, by setting the mass within a range from 0.5 mg to 10 mg, a disk drive having a good shock resistance value can be realized.

Further, since the disk in the disk drive of the present exemplary embodiment is formed so as to become thinner toward a circumferential edge thereof, deformation produced in the disk when the disk drive is subjected to an impulsive acceleration can be reduced to ⅓ of that in conventional disks. Because of this reduction in deformation, even if a larger impulsive acceleration is applied to the disk drive, collision of the disk with the head slider, due to deformation of the disk can be prevented as can occurrence of damage. Further, since maximum tensile stress and maximum compressive stress applied to the disk can be decreased to approximately ⅓ and ½, respectively, as compared to those of conventional disks, occurrence of damage of the disk itself by shock force can be prevented.

The invention claimed is:

1. A head slider for traveling over a surface of a disk-shaped recording medium so as to perform at least one of recording information onto and playing back information from the disk-shaped recording medium via a transducer, comprising:
    a front end portion on a forward side with respect to a rotational direction of the disk-shaped recording medium;
    a rear end portion on a rearward side with respect to the rotational direction of the disk-shaped recording medium;
    an opposite-to-disk surface arranged to be opposite the disk-shaped recording medium; and
    a transducer on said opposite-to-disk surface, wherein
        (i) said head slider is constructed and arranged to travel over the surface of the disk-shaped recording medium, upon rotation of the disk-shaped recording medium, under a dynamic pressure produced from a viscous fluid flow accompanying rotation of the disk-shaped recording medium and a load urging said head slider toward the disk-shaped recording medium, and
        (ii) said opposite-to-disk surface is configured to have a fixed point set at a position located rearwardly from said rear end portion and at a predetermined distance from a point of application of the load, with said head slider being constructed and arranged to rotate around the fixed point, when each of a first shock force and a different second shock force is externally applied to said head slider while traveling over the surface of the disk-shaped recording medium, in a direction in which at least one of pitch angle and roll angle decreases while each of the pitch angle and roll angle remains positive.

2. The head slider according to claim 1, wherein said opposite-to-disk surface is configured to have the predetermined distance from the point of application of the load to the fixed point set at a predetermined ratio relative to a length from said front end portion to said rear end portion, such that said head slider is allowed to rotate in a pitch direction around the fixed point.

3. The head slider according to claim 2, wherein said opposite-to-disk surface is configured to satisfy $$0.5 < L_0/L_s \leq 2,$$

where $L_0$ is the predetermined distance from the point of application of the load to the fixed point, and $L_s$ is the length from said front end portion to said rear end portion.

4. The head slider according to claim 2, wherein
said opposite-to-disk surface has a positive pressure generating section and a negative pressure generating section, with
  (i) said positive pressure generating section having
    (a) a first positive pressure generating section extended from said front end portion to a predetermined position and disposed orthogonally to a longitudinal direction of said head slider, and
    (b) a second positive pressure generating section extended from said rear end portion to a predetermined position and disposed centrally in a lateral direction orthogonal to the longitudinal direction of said head slider, and
  (ii) said negative pressure generating section being disposed centrally between said first positive pressure generating section and said second positive pressure generating section such that a center of negative pressure, when generated by said negative pressure generating section, is located at a position shifted from the point of application of the load toward said rear end portion.

5. The head slider according to claim 4, wherein
said first positive pressure generating section is provided, in connection therewith, with side rails on both sides thereof in the lateral direction of said head slider.

6. The head slider according to claim 5, wherein
the point of application of the load is to be positioned at a center of gravity of said head slider.

7. The head slider according to claim 4, wherein
the point of application of the load is to be positioned at a center of gravity of said head slider.

8. The head slider according to claim 1, wherein
said opposite-to-disk surface is configured to have the predetermined distance from the point of application of the load to the fixed point set at a predetermined ratio relative to a distance from the point of application of the load to an intersection of an extended line of said opposite-to-disk surface with the surface of the disk-shaped recording medium, such that said head slider is allowed to rotate in a pitch direction around the fixed point.

9. The head slider according to claim 4, wherein
said opposite-to-disk surface is configured to satisfy, when the distance from the point of application of the load to the fixed point is denoted by $L_0$, a length of said head slider is denoted by $L_s$, a pitch angle of said head slider while traveling over the surface of the disk-shaped recording medium is denoted by $\theta_p$, and a distance of said head slider, at said rear end portion while traveling over the surface of the disk-shaped recording medium, from the surface of the disk-shaped recording medium is denoted by $X_2$, $1 \leq L_0/L_d \leq 2.5$, where $L_d=(L_s/2)+(X_2/\tan(\theta_p))$.

10. The head slider according to claim 1, wherein,
said opposite-to-disk surface is configured to have the fixed point set at a composite position of
  (i) a position having a predetermined ratio relative to a length of said head slider, and
  (ii) a position having a predetermined ratio relative to a width of said head slider, and
said head slider is constructed and arranged such that, when a shock force is externally applied to said head slider while said head slider is traveling over the disk-shaped recording medium at a predetermined pitch angle and roll angle, said head slider rotates around the fixed point in a direction in which the pitch angle and the roll angle decrease with each of the pitch angle and roll angle maintained positive.

11. The head slider according to claim 10, wherein
said opposite-to-disk surface has
  (i) a first positive pressure generating section extended from said front end portion to a predetermined position, and
  (ii) two second positive pressure generating sections extended from said rear end portion to predetermine positions so as to generate different positive pressures relative to each other, with one of said two second positive pressure generating sections being for generating a higher positive pressure that the other of said two second positive pressure generating sections and having said transducer mounted thereon.

12. The head slider according to claim 11, wherein said opposite-to-disk surface further has
  side rails disposed on both sides thereof in a lateral direction, orthogonal to a direction from said front end portion toward said rear end portion, in connection with said first positive pressure generating section and separated from said two second positive pressure generating sections.

13. The head slider according to claim 12, wherein said opposite-to-disk surface further has
  a negative pressure generating section in an area surrounded by said first positive pressure generating section and said two second positive pressure generating sections, with a center of negative pressure, when generated by said negative pressure generating section, being located at a position shifted from the point of application of the load toward said transducer.

14. The head slider according to claim 12, wherein
the point of application of the load is to be positioned at a center of gravity of said head slider.

15. The head slider according to claim 12, wherein
the point of application of the load is to be located at a position shifted from a center of gravity of said head slider toward said transducer.

16. The head slider according to claim 13, wherein
the point of application of the load is to be positioned at a center of gravity of said head slider.

17. The head slider according to claim 13, wherein
the point of application of the load is to be located at a position shifted from a center of gravity of said head slider toward said transducer.

18. The head slider according to claim 11, wherein said opposite-to-disk surface further has
  a negative pressure generating section in an area surrounded by said first positive pressure generating section and said two second positive pressure generating sections, with a center of negative pressure, when generated by said negative pressure generating section, being located at a position shifted from the point of application of the load toward said transducer.

19. The head slider according to claim 18, wherein
the point of application of the load is to be positioned at a center of gravity of said head slider.

20. The head slider according to claim 18, wherein
the point of application of the load is to be located at a position shifted from a center of gravity of said head slider toward said transducer.

21. The head slider according to claim 11, wherein
the point of application of the load is to be positioned at a center of gravity of said head slider.

22. The head slider according to claim 11, wherein
the point of application of the load is to be located at a position shifted from a center of gravity of said head slider toward said transducer.

23. The head slider according to claim 11, further comprising:
a negative pressure generating section within said first positive pressure generating section.

24. The head slider according to claim 1, wherein
the fixed point is obtained from a ratio of rotational stiffness to vertical stiffness in a rotational direction of the disk-shaped recording medium with respect to a vertical displacement of the head slider, and is obtained when a viscous fluid film, formed as a result of viscous fluid inflow between said opposite-to-disk surface and the disk-shaped recording medium, is assumed to be a spring.

25. A head supporter comprising:
a head slider for traveling over a surface of a disk-shaped recording medium so as to perform at least one of recording information onto and playing back information from the disk-shaped recording medium via a transducer; and
a slider holder fixing said head slider to one end thereof, and fixed to a beam at another end thereof, said beam for applying a load to said head slider via a pivot section, wherein
(i) said head slider includes:
  (a) a front end portion on a forward side with respect to a rotational direction of the disk-shaped recording medium,
  (b) a rear end portion on a rearward side with respect to the rotational direction of the disk-shaped recording medium,
  (c) an opposite-to-disk surface arranged to be opposite the disk-shaped recording medium, and
  (d) a transducer on said opposite-to-disk surface,
(ii) said head slider is constructed and arranged to travel over the surface of the disk-shaped recording medium, upon rotation of the disk-shaped recording medium, under a dynamic pressure produced from a viscous fluid flow accompanying rotation of the disk-shaped recording medium and a load urging said head slider toward the disk-shaped recording medium, and
(iii) said opposite-to-disk surface is configured to have a fixed point set at a position located rearwardly from said rear end portion and at a predetermined distance from a point of application of the load, with said head slider being constructed and arranged to rotate around the fixed point, when each of a first shock force and a different second shock force is externally applied to said head slider while traveling over the surface of the disk-shaped recording medium, in a direction in which at least one of pitch angle and roll angle decreases while each of the pitch angle and roll angle remains positive.

26. A disk drive comprising:
a driver for rotatably driving a disk-shaped recording medium;
a head supporter including
(i) a head slider for traveling over a surface of the disk-shaped recording medium so as to perform at least one of recording information onto and playing back information from the disk-shaped recording medium via a transducer, and
(ii) a slider holder fixing said head slider to one end thereof, and fixed to a beam at another end thereof, said beam for applying a load to said head slider via a pivot section, wherein
  (a) said head slider includes:
    (1) a front end portion on a forward side with respect to a rotational direction of the disk-shaped recording medium,
    (2) a rear end portion on a rearward side with respect to the rotational direction of the disk-shaped recording medium,
    (3) an opposite-to-disk surface arranged to be opposite the disk-shaped recording medium, and
    (4) a transducer on said opposite-to-disk surface,
  (b) said head slider is constructed and arranged to travel over the surface of the disk-shaped recording medium, upon rotation of the disk-shaped recording medium under a dynamic pressure produced from a viscous fluid flow accompanying rotation of the disk-shaped recording medium and a load urging said head slider toward the disk-shaped recording medium, and
  (c) said opposite-to-disk surface is configured to have a fixed point set at a position located rearwardly from said rear end portion and at a predetermined distance from a point of application of the load, with said head slider being constructed and arranged to rotate around the fixed point, when each of a first shock force and a different second shock force is externally applied to said head slider while traveling over the surface of the disk-shaped recording medium, in a direction in which at least one of pitch angle and roll angle decreases while each of the pitch angle and roll angle remains positive;
an actuator arm fixing said head supporter thereto, and supported on a shaft for rotation; and
a positioning device for swinging said actuator arm.

27. The disk drive according to claim 26, wherein
mass of said head supporter is between 0.5 mg–10 mg inclusive.

28. The disk drive according to claim 27, wherein
the load is to be at most 2 gf.

29. The disk drive according to claim 26, wherein
the load is to be at most 2 gf.

30. The disk drive according to claim 26, wherein
the disk-shaped recording medium is a disk having a magnetic recording layer formed only on one surface thereof, and
said transducer is a magnetic head.

31. The disk drive according to claim 30, wherein
a surface of the disk having no recording layer formed thereon has an oblique face extended from a predetermined circumferential portion around a center of the disk toward an outer circumferential edge portion of the disk, such that thickness of the disk becomes smaller toward its outer circumferential edge at a predetermined rate.

32. A head slider for traveling over a surface of a disk-shaped recording medium so as to perform at least one of recording information onto and playing back information from the disk-shaped recording medium via a transducer, comprising:
- a front end portion on a forward side with respect to a rotational direction of the disk-shaped recording medium;
- a rear end portion on a rearward side with respect to the rotational direction of the disk-shaped recording medium;
- an opposite-to-disk surface arranged to be opposite the disk-shaped recording medium; and
- a transducer on said opposite-to-disk surface, wherein
  - (i) said head slider is constructed and arranged to travel over the surface of the disk-shaped recording medium, upon rotation of the disk-shaped recording medium, under a dynamic pressure produced from a viscous fluid flow accompanying rotation of the disk-shaped recording medium and a load urging said head slider toward the disk-shaped recording medium, and
  - (ii) said opposite-to-disk surface is configured to have a fixed point set at a position located rearwardly from said rear end portion and at a predetermined distance from a point of application of the load, with said head slider being constructed and arranged to rotate around the fixed point, when a shock force is externally applied to said head slider while traveling over the surface of the disk-shaped recording medium, in a direction in which at least one of pitch angle and roll angle decreases while each of the pitch angle and roll angle remains positive,
- wherein said opposite-to-disk surface is configured to have the predetermined distance from the point of application of the load to the fixed point set at a predetermined ratio relative to a distance from the point of application of the load to an intersection of an extended line of said opposite-to-disk surface with the surface of the disk-shaped recording medium, such that said head slider is allowed to rotate in a pitch direction around the fixed point, and
- wherein said opposite-to-disk surface is configured to satisfy, when the distance from the point of application of the load to the fixed point is denoted by $L_0$, a length of said head slider is denoted by $L_s$, a pitch angle of said head slider while traveling over the surface of the disk-shaped recording medium is denoted by $\theta_p$, and a distance of said head slider, at said rear end portion while traveling over the surface of the disk-shaped recording medium, from the surface of the disk-shaped recording medium is denoted by $X_2$, $1 \leq L_0/L_d \leq 2.5$, where $L_d = (L_s/2) + (X_2/\tan(\theta_p))$.

33. A disk drive comprising:
- a driver for rotatably driving a disk having a magnetic recording layer formed only on one surface thereof, with a surface of the disk having no recording layer formed thereon having an oblique face extended from a predetermined circumferential portion around a center of the disk toward an outer circumferential edge portion of the disk such that thickness of the disk becomes smaller toward its outer circumferential edge at a predetermined rate;
- a head supporter including
  - (i) a head slider for traveling over a surface of the disk-shaped recording medium so as to perform at least one of recording information onto and playing back information from the disk-shaped recording medium via a transducer, and
  - (ii) a slider holder fixing said head slider to one end thereof, and fixed to a beam at another end thereof, said beam for applying a load to said head slider via a pivot section, wherein
    - (a) said head slider includes:
      - (1) a front end portion on a forward side with respect to a rotational direction of the disk-shaped recording medium,
      - (2) a rear end portion on a rearward side with respect to the rotational direction of the disk-shaped recording medium,
      - (3) an opposite-to-disk surface arranged to be opposite the disk-shaped recording medium, and
      - (4) a magnetic head on said opposite-to-disk surface,
    - (b) said head slider is constructed and arranged to travel over the surface of the disk-shaped recording medium, upon rotation of the disk-shaped recording medium under a dynamic pressure produced from a viscous fluid flow accompanying rotation of the disk-shaped recording medium and a load urging said head slider toward the disk-shaped recording medium, and
    - (c) said opposite-to-disk surface is configured to have a fixed point set at a position located rearwardly from said rear end portion and at a predetermined distance from a point of application of the load, with said head slider being constructed and arranged to rotate around the fixed point, when a shock force is externally applied to said head slider while traveling over the surface of the disk-shaped recording medium, in a direction in which at least one of pitch angle and roll angle decreases while each of the pitch angle and roll angle remains positive;
- an actuator arm fixing said head supporter thereto, and supported on a shaft for rotation; and
- a positioning device for swinging said actuator arm.

* * * * *

UNITED STATES PATENT AND TRADEMARK OFFICE
CERTIFICATE OF CORRECTION

PATENT NO. : 7,095,592 B2  Page 1 of 1
APPLICATION NO. : 10/103928
DATED : August 22, 2006
INVENTOR(S) : Yoshihiro Ueno et al.

It is certified that error appears in the above-identified patent and that said Letters Patent is hereby corrected as shown below:

On the Title Page Item [56]
Under U.S. Patent Documents, change "6744600 B1" to --6744600 B2--.
Under U.S. Patent Documents, add --5,777,825   7-1998   Dorius--.

Claim 9
In column 23, line 43, replace "claim 4, wherein" with --claim 8, wherein--.

Signed and Sealed this

Thirteenth Day of March, 2007

JON W. DUDAS
*Director of the United States Patent and Trademark Office*